US012791656B2

(12) United States Patent
Stefanatos et al.

(10) Patent No.: US 12,791,656 B2
(45) Date of Patent: Nov. 10, 2026

(54) TECHNIQUES FOR MANAGING MULTI-RADAR CO-EXISTENCE BY VARYING DELAY AND PHASE

(71) Applicant: QUALCOMM Incorporated, San Diego, CA (US)

(72) Inventors: Stelios Stefanatos, San Diego, CA (US); Kapil Gulati, Belle Mead, NJ (US); Mahmoud Ashour, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 18/580,125

(22) PCT Filed: Aug. 15, 2022

(86) PCT No.: PCT/US2022/040324
§ 371 (c)(1),
(2) Date: Jan. 17, 2024

(87) PCT Pub. No.: WO2023/038765
PCT Pub. Date: Mar. 16, 2023

(65) Prior Publication Data

US 2024/0255609 A1 Aug. 1, 2024

(30) Foreign Application Priority Data

Sep. 9, 2021 (GR) .............................. 20210100593

(51) Int. Cl.
*G01S 7/28* (2006.01)
*G01S 7/02* (2006.01)
*G01S 7/282* (2006.01)

(52) U.S. Cl.
CPC .......... *G01S 7/2813* (2013.01); *G01S 7/0232* (2021.05); *G01S 7/2806* (2013.01); *G01S 7/282* (2013.01)

(58) Field of Classification Search
CPC .... G01S 7/2813; G01S 7/0232; G01S 7/2806; G01S 7/282
See application file for complete search history.

(56) References Cited

U.S. PATENT DOCUMENTS 10,855,328 B1 * 12/2020 Gulati .................. H04B 1/7103
2017/0219689 A1 * 8/2017 Hung .................... G01S 7/0232
(Continued)

OTHER PUBLICATIONS

Fan, et al., "Ghost Image Due to mmWave Radar Interference: Experiment, Mitigation and Leverage", IEEE International conference on communications workshops, Jun. 7, 2020. 13 (Year: 2020).*
(Continued)

*Primary Examiner* — Marcus E Windrich
(74) *Attorney, Agent, or Firm* — Holland & Hart LLP/QUALCOMM Incorporated

(57) ABSTRACT

Methods, systems, and devices for wireless communication are described. A communication device may generate a radar signal including a set of waveforms (e.g., chirps) based at least in part on a waveform configuration of the communication device. Each respective waveform of the set of waveforms may be associated with at least one parameter of a set of parameters. A value of the at least one parameter may be different for each respective waveform of the set of waveforms (e.g., each chirp of a set of chirps). The communication device may transmit the generated radar signal during at least one frame of a set of frames.

27 Claims, 15 Drawing Sheets

(56) References Cited

U.S. PATENT DOCUMENTS

| | | | | |
|---|---|---|---|---|
| 2019/0086509 | A1* | 3/2019 | Bilik | G01S 13/87 |
| 2019/0094334 | A1* | 3/2019 | Chang | H04B 1/713 |
| 2019/0219683 | A1* | 7/2019 | Fang | G01S 13/288 |
| 2020/0025866 | A1* | 1/2020 | Gulati | G01S 13/931 |
| 2020/0028656 | A1* | 1/2020 | Gulati | G01S 7/023 |
| 2020/0033442 | A1* | 1/2020 | Gulati | G01S 7/0234 |
| 2022/0082654 | A1* | 3/2022 | Servadei | G06N 3/006 |
| 2025/0056518 | A1* | 2/2025 | Li | H04B 7/06954 |
| 2025/0267729 | A1* | 8/2025 | Taherzadeh Boroujeni | H04L 1/08 |

OTHER PUBLICATIONS

Fan Y., et al., "Ghost Image Due to mmWave Radar Interference: Experiment, Mitigation and Leverage", IEEE International conference on communications workshops, Jun. 7, 2020, pp. 1-6, XP033796091, DOI: 10.1109/ICCWORKSHOPS49005.2020.9145047, Section V.B, Figure 13.

International Search Report and Written Opinion—PCT/US2022/040324—ISA/EPO—Nov. 24, 2022 (2105919WO).

* cited by examiner

TECHNIQUES FOR MANAGING MULTI-RADAR CO-EXISTENCE BY VARYING DELAY AND PHASE

CROSS REFERENCE

The present Application is a 371 national stage filing of International PCT Application No. PCT/US2022/040324 by STEFANATOS et al. entitled "TECHNIQUES FOR MANAGING MULTI-RADAR CO-EXISTENCE BY VARYING DELAY AND PHASE," filed Aug. 15, 2022; and claims priority to Greece Patent Application No. 20210100593 by STEFANATOS et al., entitled "TECHNIQUES FOR MANAGING MULTI-RADAR CO-EXISTENCE BY VARYING DELAY AND PHASE," filed Sep. 9, 2021, each of which is assigned to the assignee hereof, and each of which is expressly incorporated by reference in its entirety herein.

FIELD OF TECHNOLOGY

The following relates to wireless communication, including techniques for managing multi-radar co-existence by varying delay and phase.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). A communication device may be configured with one or more radars. A radar may experience interference from signals implemented for detection and collision avoidance. For example, a radar may transmit a signal and the radar signal may experience interference with another radar signal from another radar associated with another communication device. The interference may result in inaccurate and inefficient detection and collision avoidance. As more communication devices (e.g., vehicles in cellular vehicle-to-everything (C-V2X) systems) implement radar, interference may become more common which may obscure or drown out signaling. Such radar signaling may have difficulty discerning between targets and ghost targets in the wireless multiple-access communications system.

SUMMARY

Various aspects of the present disclosure relate to techniques for managing multi-radar co-existence by varying delay and phase of a radar signal. A communication device configured with a radar may avoid detection of ghost targets in a wireless communications system. For example, a communication device may apply a distinct delay between each chirp (also referred to as a waveform) of a radar signal. Each delay may have a unique duration, which may result in a chirp transmission that is non-periodic. The communication device may apply delay patterns (e.g., a series of delays between chirps) that are different from delay patterns applied by other radars. As such, the communication device may differentiate between detected signals based on a delay pattern of a signal, which may enable the radar to effectively manage ghost targets. Additionally, or alternatively, the communication device may apply a distinct phase to each chirp of a radar signal. Although the phase of each chirp may vary, chirp transmissions may remain periodic. For example, the communication device may apply phase patterns (e.g., a series of chirps with distinct phases) that are different from phase patterns applied by other radars. As such, a communication device configured with a radar may differentiate between detected signals based on a phase pattern of a signal, which may enable the communication device to effectively manage ghost targets.

DETAILED DESCRIPTION

Figure 1:
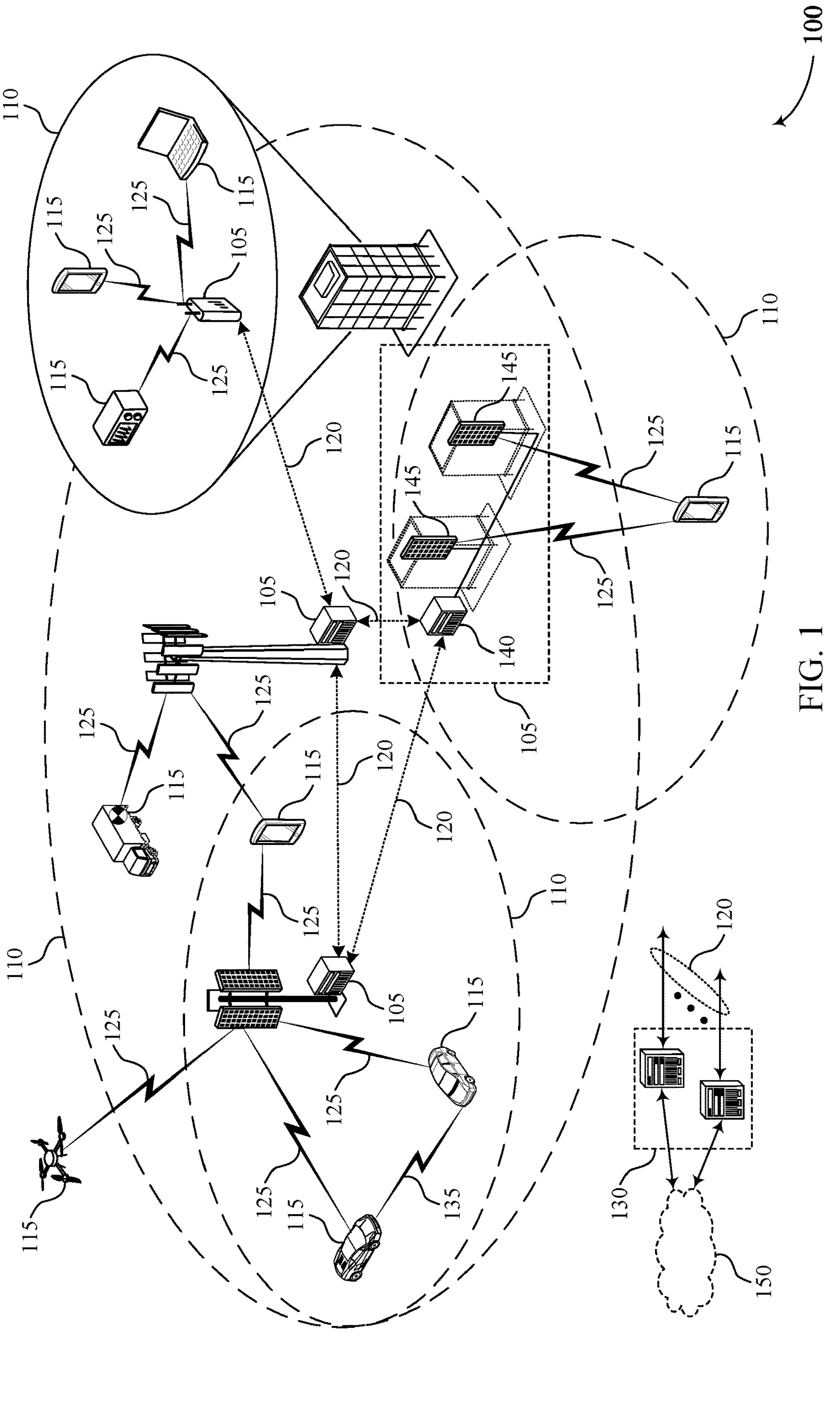
FIGS. 1 and 2 illustrate examples of wireless communications systems that support techniques for managing multi-radar co-existence by varying delay and phase in accordance with aspects of the present disclosure.

A wireless communications system may support radar signaling. For example, the wireless communications system may include communication devices configured with one or multiple radars. A radar may transmit signaling (e.g., electromagnetic waves) and receive (e.g., detect) reflected signals in order to estimate properties of nearby targets (e.g., objects, vehicles, people, obstructions). Example properties may include distance, speed, and angular location of nearby targets. Examples of radar signaling may include frequency modulated continuous wave (FMCW) radar signaling and phase modulated continuous wave (PMCW) radar signaling, among other examples. One or more radars may be used by the communication devices (e.g., a vehicle) as a sensor input which may enable advanced driver assistance systems (ADAS), among other examples. In some cases, a communication device configured with at least one radar may detect stray signaling (e.g., interference) from one or more nearby communication device configured with one or more radars.

Multiple communication devices (e.g., radars) may operate over a same frequency band of a frequency spectrum, which may cause interference and produce an increased broadband noise floor and ghost targets (e.g., apparent targets). A communication device (e.g., a radar) may transmit a signal at a respective frequency band of frequency spectrum. The communication device may be configured to detect signals (e.g., reflected signals) of the transmitted signal at the respective frequency band. However, if multiple communication devices (e.g., radars) are configured to transmit and detect signals at the respective frequency band, the communication device may be unable to differentiate between signals. That is, a radar may be unable to determine the source of a received signal, which may result in the detection of ghost targets if a signal originating from another radar is interpreted as a reflection of its own signal over a target. A ghost target result by receiving a signal originating from another radar source. This signal may be received directly (i.e., line of sight link), although receiving a version of it after reflecting to some target is also possible. In some cases, the communication devices may support coordinated interference, which may decrease the broadband noise floor by coordinating parameters (e.g., FMCW parameters such as frequency sweep and chirp duration) among multiple radars. As part of the coordinated interference, the communication devices (e.g., all radars) may use the same FMCW parameters, resulting in transmitting the same FMCW signal. Although coordinated interference may decrease the broadband noise floor, coordinated interference may also increase interference associated with ghost targets. As a result, these ghost targets may be detected and may interfere with radar communications.

Various aspects of the present disclosure relate to techniques for managing multi-radar co-existence by varying delay and phase under coordinated interference. For example, a communication device may apply a distinct delay between each waveform (e.g., chirp) of a radar signal. Each delay may have a unique duration, which may result in a chirp transmission that is non-periodic. A radar may apply delay patterns (e.g., a series of delays between chirps) that are different from delay patterns applied by other radars. As such, a communication device may differentiate between detected signals based on a delay pattern of a signal, which may enable the communication device to effectively manage (e.g., filter, disregard) ghost targets. Additionally, or alternatively, a communication device may apply a distinct phase to each chirp of a radar signal. Although the phase of each chirp may vary, chirp transmissions may remain periodic. A radar may apply phase patterns (e.g., a series of chirps with distinct phases) that are different from phase patterns applied by other radars. As such, a communication device may differentiate between detected signals based on a phase pattern of a signal, which may enable the communication device to effectively manage ghost targets. By managing multi-radar co-existence by varying delay and phase, a communication device may experience reduced power consumption. Additionally, by managing multi-radar co-existence by varying delay and phase, a communication device may experience low latency and high reliability of wireless communications.

Aspects of the disclosure are initially described in the context of wireless communications systems. Aspects of the disclosure are further illustrated by and described with reference to apparatus diagrams, system diagrams, and flowcharts that relate to techniques for managing multi-radar co-existence by varying delay and phase.

FIG. 1 illustrates an example of a wireless communications system 100 that supports techniques for managing multi-radar co-existence by varying delay and phase in accordance with aspects of the present disclosure. The wireless communications system 100 may include one or more base stations 105, one or more UEs 115, and a core network 130. In some examples, the wireless communications system 100 may be an LTE network, an LTE-Advanced (LTE-A) network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples. The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology). The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI)

may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB)) that may provide access for different types of devices.

A base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In the wireless communications system 100, a communication device, such as one or more of a base station 105 or a UE 115 may apply a distinct delay between each waveform (e.g., chirp) of a radar signal. Each delay may have a unique duration, which may result in a chirp transmission that is non-periodic. A radar may apply delay patterns (e.g., a series of delays between chirps) that are different from delay patterns applied by other radars. As such, one or more of a base station 105 or a UE 115 may differentiate between detected signals based on a delay pattern of a signal, which may enable one or more of the base station 105 or the UE 115 to effectively manage (e.g., filter, disregard) ghost targets. Additionally, or alternatively, one or more of a base station 105 or a UE 115 may apply a distinct phase to each chirp of a radar signal. Although the phase of each chirp may vary, chirp transmissions may remain periodic. A radar may apply phase patterns (e.g., a series of chirps with distinct phases) that are different from phase patterns applied by other radars. As such, one or more of a base station 105 or a UE 115 may differentiate between detected signals based on a phase pattern of a signal, which may enable one or more of the base station 105 or the UE 115 to effectively manage ghost targets.

Figure 2:
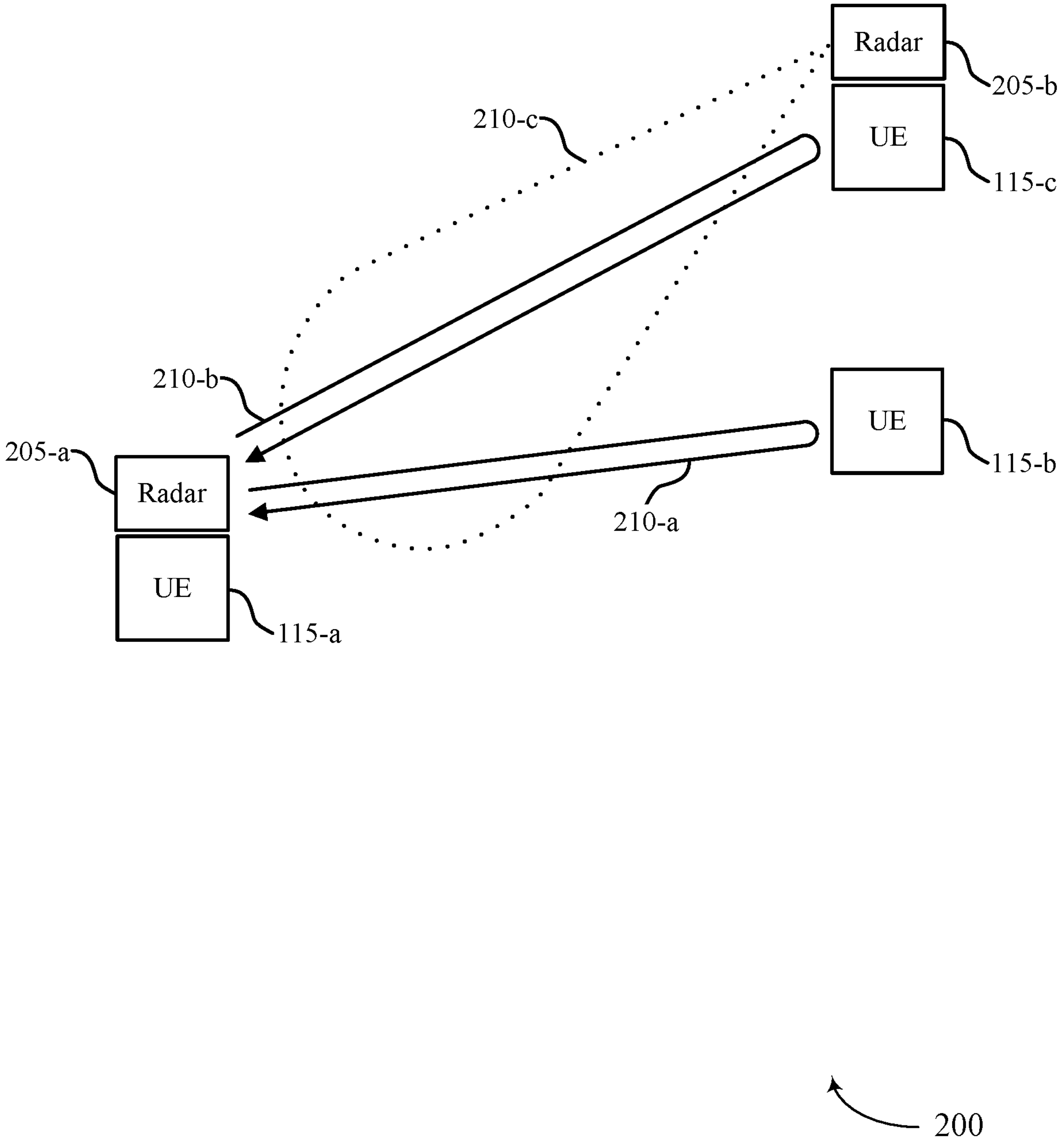

FIG. 2 illustrates an example of a wireless communications system 200 that supports techniques for managing multi-radar co-existence by varying delay and phase in accordance with aspects of the present disclosure. The wireless communications system 200 may implement or be implemented by one or more aspects of the wireless communications system 100. For example, the wireless communications system 200 may include a UE 115-*a*, a UE 115-*b*, and a UE 115-*c*, which may be examples of corresponding UEs 115 as described with reference to FIG. 1. In the example of FIG. 2, a UE 115 may be configured with one or more radars 205. For example, the UE 115-*a* may be configured with a radar 205-*a* and the UE 115-*c* may be configured with a radar 205-*b*. In some cases, the radars 205 may be examples of FMCW radars.

The radars 205 may transmit and detect signaling 210. For example, the radars 205 may transmit signaling 210 in order to determine properties of nearby targets, which may be other UEs 115. In some cases, a UE 115 may attempt to measure properties associated with other UEs 115 within the wireless communications system 200. For example, UEs 115 may be examples of vehicles, which may utilize range and speed information associated with other UEs 115 to conduct operations associated with autonomous driving. In some cases, the radar 205-*a* may transmit signaling 210-*a*, which may be reflected by one or more objects such as the UE 115-*b*. The radar 205-*a* may additionally receive (e.g., detect) the signaling 210-*a* that is reflected by the UE 115-*b*. The radar 205-*a* may determine one or more properties associated with the UE 115-*b* based on the signaling 210-*a*. For example, the radar 205-*a* may measure a duration of time between the transmission of signaling 210-*a* and the detection of signaling 210-*a* at the UE 115-*a* (e.g., after the signaling 210-*a* is reflected by the UE 115-*b*).

The radar 205-*a* or the UE 115-*a* may determine a distance between the UE 115-*b* and the UE 115-*a* based on the duration of time. The radar 205-*a* may additionally or alternatively detect signaling 210 directly from other radars 205. For example, the radar 205-*a* may detect signaling 210-*c* from the radar 205-*b*. In some cases, the radar 205-*a* may be unable to differentiate between the signaling 210-*c*, the signaling 210-*b* (e.g., after reflection by the UE 115-*c*), and the signaling 210-*a* (e.g., after reflection by the UE 115-*b*). That is, the radars 205 may not have a provision for operation under interference. For example, the radar 205-*a* and the radar 205-*b* may transmit signaling 210 using a same frequency band. The radar 205-*a* may transmit signaling 210-*b*, which may be reflected by the UE 115-*c*. The radar 205-*b* may transmit signaling 210-*c* in the direction of radar 205-*a*. The signaling 210-*c* may act (e.g., may be detected) as unwanted interference at the radar 205-*a*.

The radar 205-*a* may receive both the reflected signaling 210-*b* and signaling 210-*c*, which may have a same frequency band. The signaling 210-*c* may increase a broadband noise floor, which may render target detection less reliable for the radar 205-*a*. Additionally or alternatively, the UE 115-*a* may detect a ghost target associated with the signaling 210-*c*. That is, the UE 115-*a* may detect a ghost target that does not exist, or does not exist in a detected location. In some cases, ghost targets may be referred to as false alarms. Adverse effects from both the detection of ghost targets and increases in the broadband noise floor may be detrimental for automotive applications, among other applications where radars are implemented.

Figure 3:
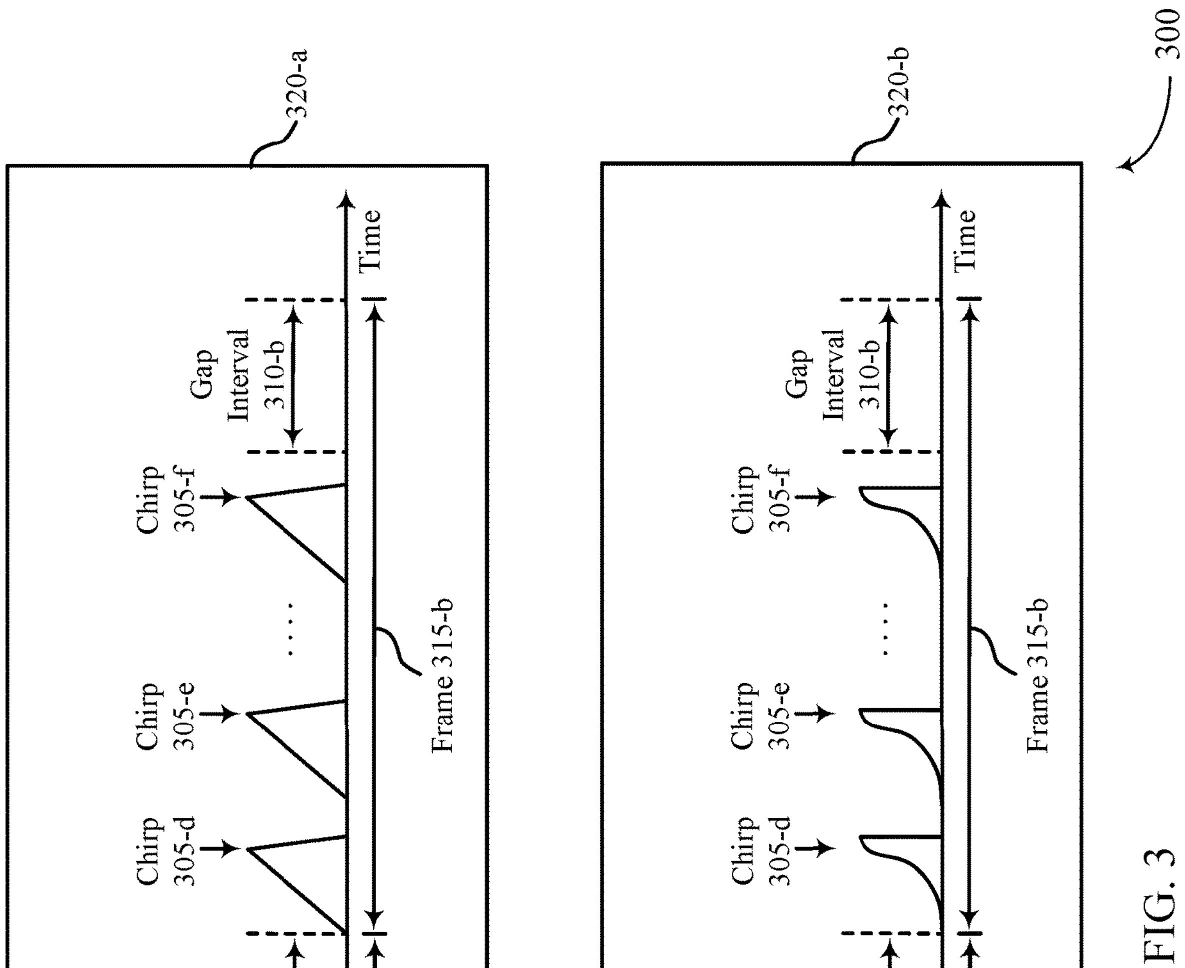
FIGS. 3 through 6 illustrate examples of signaling diagrams that support techniques for managing multi-radar co-existence by varying delay and/or phase in accordance with aspects of the present disclosure.

FIG. 3 illustrates an example of a signaling diagram 300 that supports techniques for managing multi-radar co-existence by varying delay and phase in accordance with aspects of the present disclosure. The signaling diagram 300 may implement, or be implemented by aspects of the wireless communications system 100, the wireless communications system 200, or both. The signaling diagram 300 may include a frequency diagram 320-*a* and a phase diagram 320-*b*. In some cases, the frequency diagram 320-*a* and the phase diagram 320-*b* may be representations of a same signal. For example, the frequency diagram 320-*a* may depict a signal with respect to time and instantaneous frequency, while the phase diagram 320-*a* may depict the signal with respect to time and instantaneous phase. The signals may be an example of signaling 210 as described with reference to FIG. 2.

In some cases, the frequency diagram 320-*a* and the phase diagram 320-*b* may include chirps 305, which may alternatively be referred to as "waveforms." The chirps 305 may represent a modulation of a radar signal. For example, a base station 105 or a UE 115 configured with a radar may modulate a frequency of a signal over a range of frequencies. A single chirp 305 may include both an upchirp and a downchirp. An upchirp may correspond to a duration of time where a radar modulates a signal by increasing the frequency of the signal. A downchirp may correspond to a duration of time where a radar modulates a signal by decreasing the frequency of the signal. In some cases, a radar may transmit only an upchirp.

The frequency diagram 320-*a* and the phase diagram 320-*b* may also include one or more frames 315. A frame 315 may include a quantity of chirps as well as a gap interval 310. In some cases, a gap interval 310 may follow a last chirp 305 of a frame 315. In some cases, a base station 105 or a UE 115 may transmit chirps 305 periodically, based on a chirp period. A base station 105 or a UE 115 may transmit frames 315 periodically, based on a frame period. In some cases, a base station 105 or a UE 115 may select frame and chirp periods as well as other parameters (e.g., bandwidth, upchirp duration) based on an application. For example, a base station 105 or a UE 115 may select a high bandwidth for signaling in order to achieve high resolution for range measurements. Similarly, a base station 105 or a UE 115 may select a small chirp period in order to detect a large range of velocities.

A base station 105 or a UE 115 may determine a distance of a target from the radar (e.g., a range of the target) by measuring a duration of time between the transmission of a frame 315 and detection of the frame 315 (e.g., after the target reflects the frame 315). In some cases, a base station 105 or a UE 115 may select a frame duration such that targets may be accurately approximated as stationary (e.g., static) within the frame duration. For example, a frame 315 may have a duration of a few tens of milliseconds. The frame 315 may include a plurality of chirps 305. Although a target may have a non-zero velocity, a base station 105 or a UE 115 may approximate the target as stationary for the duration of the frame 315 (e.g., a few tens of milliseconds). Accordingly, a base station 105 or a UE 115 may measure a range of a target on a per-frame basis. That is, a base station 105 or a UE 115 may measure a duration of time between a transmission of a frame 315 and detection of the frame 315, rather than measuring a duration of time between individual chirps 305. A base station 105 or a UE 115 may determine a range of a target based on Equation (1), shown below.

$$d = \frac{c\tau}{2} \quad (1)$$

In Equation (1), d may be defined as the range of a target, c is defined as the speed of light, and $\tau$ is defined as the delay of the return frame. A base station 105 or a UE 115 may also determine a radial velocity of a target by measuring a linear rate of increase or decrease of phase across chirps 305 of a frame 315. In some cases, a base station 105 or a UE 115 may determine positions (e.g., ranges) and speeds of detected targets ("detections") for every frame period. That is, a base station 105 or a UE 115 may repeat the position and speed detection procedure for each frame period. In some cases, a base station 105 or a UE 115 may combine (e.g., stack) target detections for each frame, which may result in a time series of detections. A base station 105 or a UE 115 may combine detections for each frame duration (e.g., each time instance corresponding to a frame). A base station 105 or a UE 115 may process the time series of detections and establish target trajectories ("tracks"). In some cases, a base station 105 or a UE 115 may predict one or more future states of a target based on detected tracks.

A base station 105 or a UE 115 may detect interference from other radars as described above with reference to FIG. 2. In some cases, interference may increase a broadband noise floor. For example, interfering signals may prevent a radar from detecting reflected signals. To decrease the broadband noise floor, one or more radars may implement coordinated interference. The coordinated interference may include coordinating a base station 105 or a UE 115 to follow the same parameters of their transmitted FMCW signals. Examples of parameters may include frequency sweep range (e.g., bandwidth) and chirp duration (e.g., chirp period). Although the coordinated interference may reduce the broadband noise floor, interference may appear as one or more ghost targets that may not be differentiable from actual targets. In some cases, a base station 105 or a UE 115 may detect a ghost target when the beat frequency of the interfering ghost target lies within the range of detected frequencies of the base station 105 or the UE 115. As a result, ghost targets may reduce the accuracy of radar communications.

Figure 4:
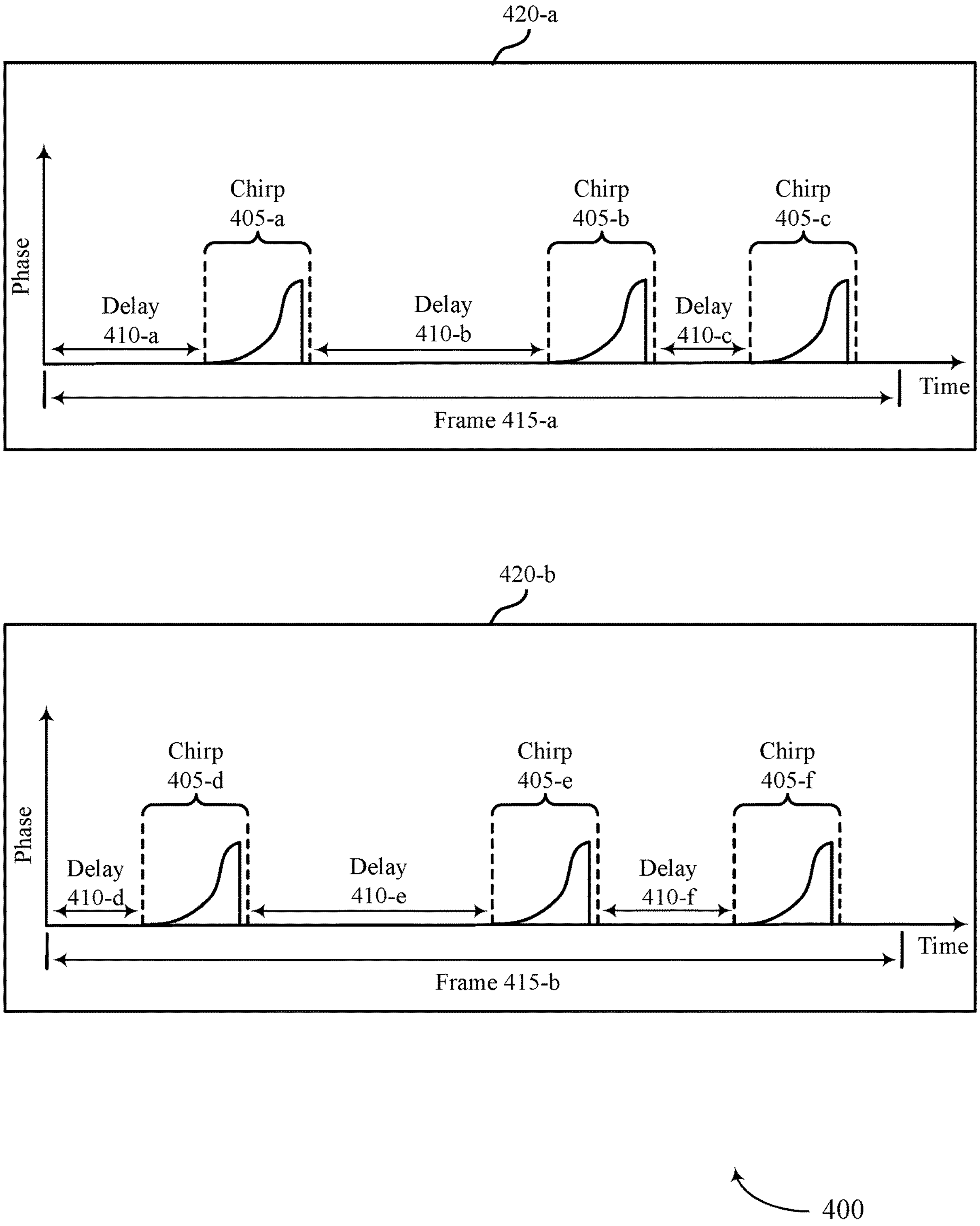

FIG. 4 illustrates an example of a signaling diagram 400 that supports techniques for managing multi-radar co-existence by varying delay and phase in accordance with aspects of the present disclosure. The signaling diagram 400 may implement, or be implemented by aspects of the wireless communications system 100, the wireless communications system 200, or both. In some cases, the signaling diagram 400 may be illustrated by a phase diagram 420-*a* and a phase diagram 420-*b*. The phase diagram 420-*a* may illustrate signaling of by a first radar associated with one or more of a base station 105 or a UE 115, while the phase diagram 420-*b* may illustrate signaling by a second radar associated with one or more of a base station 105 or a UE 115. The signals may be examples of signaling 210 as described with reference to FIG. 2.

In the phase diagram 420-*a*, a radar signal may include one or more frames 415. The frames 415 of a radar signal may include chirps 405 and delays 410 between chirps 405. In some examples, a radar may transmit signaling with varying delays 410 between the chirps 405. For example, a first radar may transmit signaling depicted by phase diagram 420-*a*. The signaling may include a chirp 405-*a*, a chirp 405-*b* and a chirp 405-*c*. The radar may apply a delay 410 between each chirp 405. For example, the radar may apply a delay 410-*a* between the beginning of the frame 415-*a* and the beginning of the chirp 405-*a*. Similarly, the radar may apply a delay 410-*b* between the chirp 405-*a* and the chirp 405-*b*, as well as a delay 410-*c* between the chirp 405-*b* and the chirp 405-*c*. The delay 410-*a*, the delay 410-*b*, and the delay 410-*c* may each be unique (e.g., the delays 410 may each have unique time durations), which may result in a non-periodic chirp transmission. That is, the chirps 405 may occur non-periodically within the frame 415-*a*.

In some cases, each radar may apply different delay patterns. For example, the phase diagram 420-*b* may illustrate a delay pattern applied by a second radar. In some cases, a delay 410-*d* may be different from the delay 410-*a*, a delay 410-*e* may be different from the delay 410-*b*, and a delay 410-*f* may be different from the delay 410-*c*. Although the phase diagram 420-*a* and the phase diagram 420-*b* are shown to have a same start time for the purposes of visualization, the frame 415-*a* and frame 415-*b* may not occur at a same time instance. In some cases, the phase diagram 420-*a* and the phase diagram 420-*b* may represent radar signaling transmitted by interfering radars. For example, the phase diagram 420-*a* and the phase diagram 420-*b* may represent signals detected by a radar as interference or as a ghost target.

A radar may compare frames 415 of a transmitted signal and a detected signal to determine properties associated with potential targets. For example, a radar may transmit the frame 415-*a*, which may include the chirp 405-*a*, the chirp 405-*b*, and the chirp 405-*c*. The transmission may be reflected by a target and the radar may detect the reflected transmission. The radar may compare the frame 415-*a* of the transmitted signal with a frame 415 of the detected signal (e.g., using a mixer or other signal processing techniques). The radar may detect the reflected signal after a duration of time. For example, the radar may combine the transmitted signal and the detected signal, and the detected signal may be offset by a duration of time. That is, the radar may measure a time offset (e.g., a uniform time offset) between transmitted chirps 405 and detected chirps 405. The time offset may correspond to the range of the detected target. In some cases, a range of a target may be measured for each chirp 405 of a frame 415. Additionally or alternatively, range measurements of each chirp 405 within a frame 415 (e.g., a range spectrum) may be combined, mixed, and/or averaged to determine a range of a target.

As discussed above with reference to FIG. 3, the length of a frame 415 may be relatively small when compared to a timescale to detect movement of a target. For example, a frame 415 may be a few tens of milliseconds. A radar may approximate that a range measured by each chirp 405 within a frame 415 is the same. In some cases, a radar may determine a range of a target by comparing a transmitted frame 415 to a detected frame 415. The radar may compare each transmitted chirp 405 and each detected chirp 405 within a frame 415. The radar may determine a time and/or frequency difference between transmitted chirps 405 and detected chirps 405, which may correspond to a range of a target. The radar may analyze one or more frequencies of the signal resulting after mixing the transmitted with the detected signal (e.g., using Fourier Transform (FFT) analysis).

Figure 5:
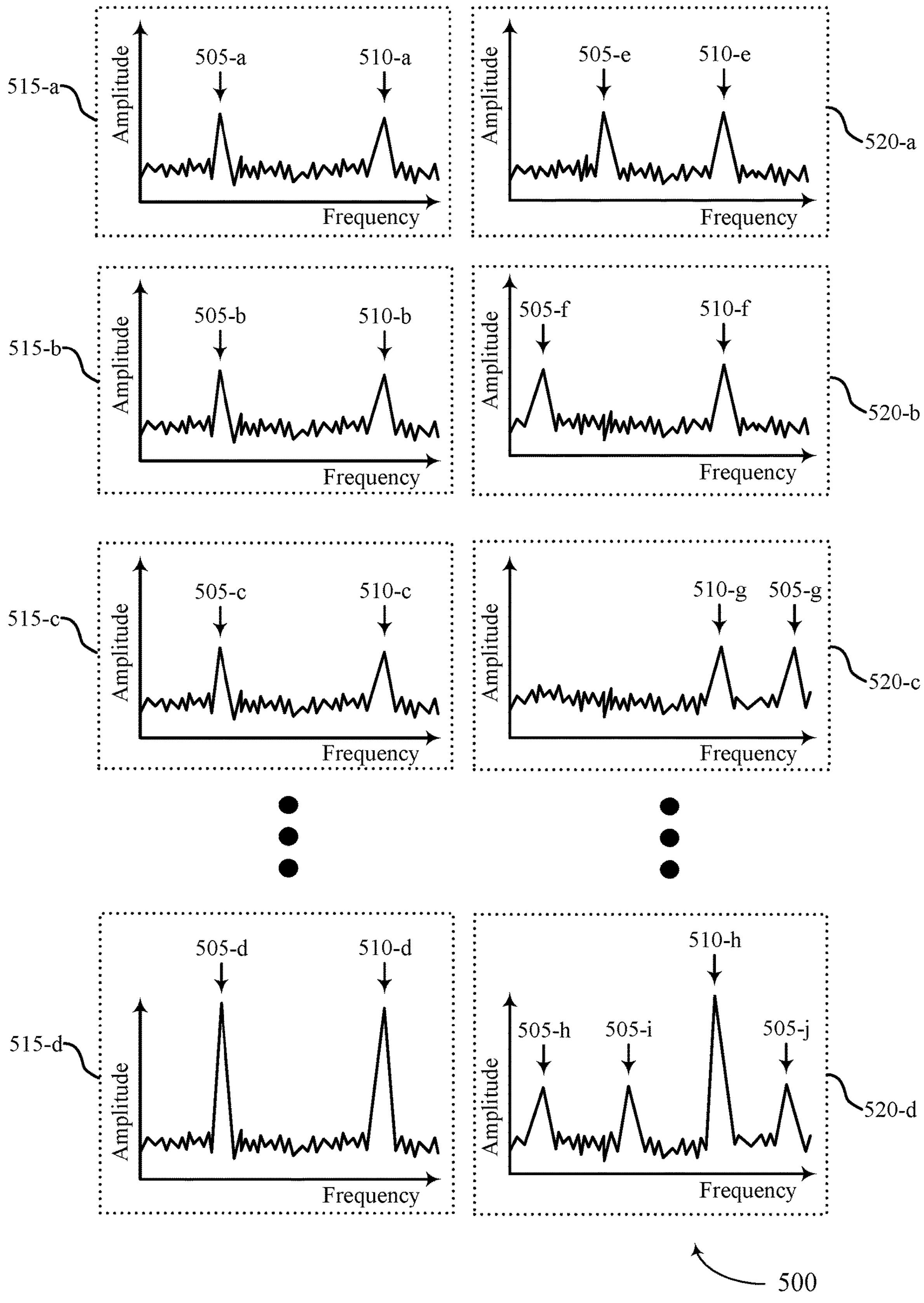

FIG. 5 illustrates an example of a signaling diagram 500 that supports techniques for managing multi-radar co-existence by varying delay and phase in accordance with aspects of the present disclosure. The signaling diagram 500 may implement, or be implemented by aspects of the wireless communications system 100, the wireless communications system 200, or both. The signaling diagram 500 may be illustrated by frequency diagrams 515 and frequency diagrams 525. The frequency diagrams 515 may illustrate signaling associated with one or more radars that do not apply variable delay to each chirp of a radar signal. The frequency diagrams 525 may illustrate signaling associated with a radar that varies delay in accordance with aspects of the present disclosure.

A base station 105 or a UE 115 configured with a radar may perform signal processing to determine a range associated with a target. For example, a radar may mix a detected signal with a transmitted signal. The radar may compare chirps of the detected signal with chirps of the transmitted signal and may determine a frequency offset between the detected and transmitted chirps. The radar may examine each chirp in the frequency domain (i.e., applied FFT to the samples of each chirp). If a target is present, the FFT may reveal a frequency component is present, with a frequency that is proportional to the delay with which the reflection returned to the radar, and, in turn to the distance of the target.

A frequency diagram 515-*a*, a frequency diagram 515-*b*, and a frequency diagram 515-*c* may each correspond to a chirp included in a single frame. As part of a signal processing, a radar may determine a range associated with a target on a per-frame basis. For example, a radar may average or combine frequency information associated with multiple chirps to determine a range of a target for a given frame. A radar may combine the frequency diagram 515-*a*, the frequency diagram 515-*b*, and the frequency diagram 515-*c* (e.g., the radar may combine a range spectrum) to determine a range of a target. A frequency diagram 515-*d* may be a combination of the frequency diagram 515-*a*, the frequency diagram 515-*b*, and the frequency diagram 515-*c*. In some cases, a radar may determine a range of a target by non-coherently combining the range spectrum associated with each chirp within a frame. In some cases, the radar may employ constant false alarm rate (CFAR) detection, which may refer to a method for differentiating targets from noise.

In some cases, frequency diagrams 515 may represent FMCW radar signaling where radars (e.g., both victim and interfering radars) do not apply varying delays nor phases between chirps of a frame. The frequency diagram 515-*a* may represent a signal associated with a first chirp of a frame. The signal may include a target peak 510-*a* and a ghost target peak 505-*a*. The target peak 510-*a* may occur at a frequency that corresponds to a measured difference between a transmitted signal and a detected signal. For example, a radar may compare a transmitted signal to a detected signal (e.g., a signal reflected by a target) and may measure both a time and frequency offset between a chirp of the transmitted signal and a chirp of the detected signal. The radar may also detect interference, which may result in ghost target peak 505-*a*. For example, the radar may compare the transmitted signal to a detected signal, which may also include interfering chirps from another radar. The radar may measure a time and frequency offset between a first chirp of the transmitted signal and a chirp of the detected, interfering signal. The ghost target peak may be centered at a frequency that corresponds to a measured difference between a transmitted signal and a detected, interfering signal.

The frequency diagram 515-*b* may represent a signal associated with a second chirp of a frame. The frequency diagram 515-*b* may include a target peak 510-*b* and a ghost target peak 505-*b*. The target peak 510-*b* may result from a comparison of a transmitted second chirp with a detected second chirp. The target peak 510-*b* may be centered at a frequency that corresponds to a frequency difference between the transmitted second chirp and the detected second chirp (e.g., that is reflected by a target). The target peak 510-*b* may be centered at a same frequency as the target peak 510-*a*. The ghost target peak 505-*b* may be centered at a frequency that corresponds to a frequency difference between the transmitted second chirp and a second chirp from an interfering radar.

The frequency diagram 515-*c* may represent a signal associated with a third chirp of a frame. The frequency diagram 515-*c* may include a target peak 510-*c* and a ghost target peak 505-*d*. The target peak 510-*c* may be centered at a frequency that corresponds to a frequency difference between the transmitted third chirp and the detected third chip (e.g., that is reflected by a target). The target peak 510-*c* may be centered at a same frequency as the target peak 510-*a* and the target peak 510-*b*. The ghost target peak 505-*c* may be centered at a frequency that corresponds to a frequency difference between the transmitted second chirp and a second chirp from an interfering radar.

The frequency diagram 515-*d* may result from combing the frequency diagram 515-*a*, the frequency diagram 515-*b*, and the frequency diagram 515-*c*. The frequency diagram 515-*d* may include a target peak 510-*d* and a ghost target peak 505-*d*. In some cases, the target peak 510-*d* and the ghost target peak 505-*d* may both be interpreted by a radar as targets. In some cases, the target peak 510-*d* and the ghost target peak 505-*d* may both have a same or similar amplitude, which may prevent a radar from determining if the target peak 510-*d* is associated with a target or a ghost target. Similarly, the radar may be unable to determine if the ghost target peak 505-*d* is associated with a target or a ghost target.

The frequency diagrams 520 may illustrate FMCW radar signaling where radars (e.g., both victim and interfering radars) apply varying delays between chirps of a frame. The frequency diagram 520-*a* may correspond to a first chirp of a frame, the frequency diagram 520-*b* may correspond to a second chirp of a frame, and the frequency diagram 520-*c* may correspond to a third chirp of a frame. As described above with reference to FIG. 4, a radar may apply a delay between each chirp of a frame. As a result, the radar may detect a reflected signal with a unique delay between each chirp. In some cases, the delays between each chirp may correspond to a delay pattern unique to the radar.

The radar may additionally detect an interfering signal from a second radar. The radar may process (e.g., mix) the detected signals and compare each detected chirp to a transmitted chirp. A frequency difference between a first transmitted chirp and a first chirp reflected by a target may be represented by the target peak 510-*e*. That is, the target peak 510-*e* may be centered at a frequency that corresponds to the frequency difference between the first transmitted chirp and the first chirp reflected by the target. The delay pattern between chirps of a reflected frame may match the delay pattern between chirps of a transmitted frame. As a result, a frequency difference between each chirp within a frame may be the same.

Accordingly, the target peak 510-*e*, the target peak 510-*f*, the target peak 510-*g*, and the target peak 510-*h* may be centered at the same frequency. However, an interfering radar may apply a different delay pattern between chirps. As a result, each ghost target peak 505 may be centered at a different frequency. For example, the ghost target peak 505-*e* may be centered at a frequency different from the ghost target peak 505-*f*. Similarly, the ghost target peak 505-*g* may be centered at a frequency different from the ghost target peak 505-*f* and the ghost target peak 505-*e*.

The frequency diagram 520-*d* may result from combing the frequency diagram 520-*a*, the frequency diagram 520-*b*, and the frequency diagram 520-*c*. The frequency diagram 520-*d* may include a target peak 510-*h*, a ghost target peak 505-*h*, a ghost target peak 505-*i*, and a ghost target peak 505-*j*. The target peak 510-*e*, the target peak 510-*f*, and the target peak 510-*g* may combine to create a target peak 510-*h*, which may have an amplitude greater than amplitudes of ghost target peaks 505. As a result, the radar may identify that the target peak 510-*h* corresponds to a target peak and the ghost target peaks 505 correspond to ghost targets. The radar may accordingly discard ghost target peaks 505. That is, a radar may determine that every chirp in a frame is associated with an interfering signal (e.g., and a corresponding ghost target). However, combining the chirps may not result in a strong ghost peak 505, which may prevent the radar from erroneously identifying a ghost target peak 505 as a target peak 510.

In some cases, a radar may not detect ghost target peaks 505, which may eliminate the need for subsequent filtering of ghost targets. Additionally or alternatively, applying varying delays to each chirp of a frame may allow for conventional FMCW processing at a receiving radar. For example, a receiving radar may mix a received signal with a transmitted signal. The receiving radar may also apply filtering and sampling techniques to process the FMCW signal. Similarly, a procedure may be employed for extraction of a targets range, which may be based on range profile computation and peak identification.

Figure 6:
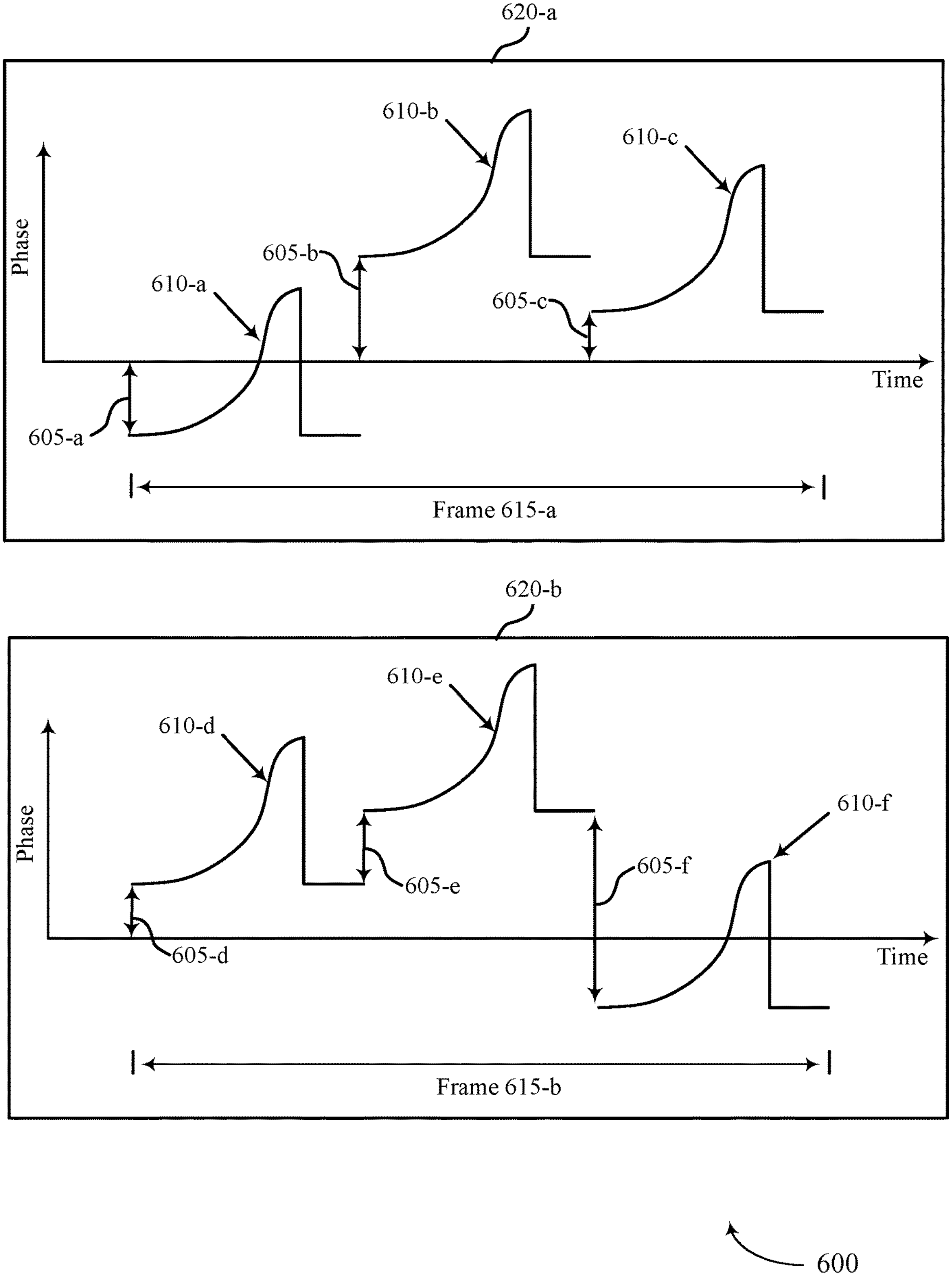

FIG. 6 illustrates an example of a signaling diagram 600 that supports techniques for managing multi-radar co-existence by varying phase in accordance with aspects of the present disclosure. The signaling diagram 600 may implement, or be implemented by aspects of the wireless communications system 100, the wireless communications system 200, or both. In some cases, the signaling diagram 600 may be illustrated by a phase diagram 620-*a* and a phase diagram 620-*b*. The phase diagram 620-*a* may illustrate signaling of a first radar associated with one or more of a base station 105 or a UE 115, while the phase diagram 620-*b* may illustrate signaling of a second radar associated with one or more of a base station 105 or a UE 115. The signals may be examples of signaling 210 as described with reference to FIG. 2.

As illustrated by the phase diagrams 620, a radar signal may include one or more frames 615. The frames 615 of a radar signal may include chirps 610. In some cases, a radar may apply an initial phase 605 to each chirp within a frame. For example, a first radar corresponding to the phase diagram 620-*a* may transmit signaling depicted by the phase diagram 620-*a*. The signaling may include a chirp 610-*a*, a chirp 610-*b* and a chirp 610-*c*. The radar may apply a phase 605 to each chirp 610. For example, the radar may apply a phase 605-*a* to a chirp 610-*a*. Similarly, the radar may apply a phase 605-*b* to a chirp 610-*b* and a phase 605-*c* to a chirp 610-*c*. The phase 605-*a*, the phase 605-*b*, and the phase 605-*c* may each be unique (e.g., the value of each phase 605 may be different).

In some cases, different radars may apply different phase patterns. For example, the phase diagram 620-*b* may illustrate a phase pattern applied by a second radar. In some cases, a phase 605-*d* may be different from the phase 605-*a*, a phase 605-*e* may be different from the phase 605-*b*, and a phase 605-*f* may be different from the phase 605-*c*. Although the phase diagram 620-*a* and the phase diagram 620-*b* are shown to have a same start time for the purposes of visualization, a frame 615-*a* and a frame 615-*b* may not occur at a same time instance. In some cases, the phase diagram 620-*a* and the phase diagram 620-*b* may represent FMCW signals transmitted by interfering radars. For example, the phase diagram 620-*a* and the phase diagram 620-*b* may represent signals detected by a radar as interference or a ghost target.

A radar signal with chirps of varying phase may be represented mathematically. A frame 615 may consist of a number of chirps 610, $N_c$, which may be transmitted in succession. A chirp 610 may be represented below by Equation (2), where $f_c$ is a carrier frequency (e.g., 77 GHz), B is a chirp bandwidth (e.g., 1 GHz), $T_{up}$ is an upchirp duration where the chirp instantaneous frequency increases linearly from $f_c$, c is a constant complex scalar that captures aspects such as phased-locked loop (PLL) phase, t is time, m is a number of the chirp, and $T_c$ is a chirp duration.

$$x_m(t) = c \times e^{i2\pi f_c(t-mT_c)} e^{i2\pi\left(\frac{B}{Tup}\right)(t-mT_c)^2} \quad (2)$$

In Equation (2), $mT_c \le 1 \le mT_c + T_{up}$, where m=0, 1 . . . $N_c-1$ and denotes the $m^{th}$ chirp. The parameters included in Equation (2) may be implemented by all radars within a wireless communications system. A FMCW radar signal with chirps of varying phase may be represented below by Equation (3) where $\varphi_m$ is an artificially introduced phase to the $m^{th}$ chirp.

$$x_m(t) = e^{i\varphi_m} \times c \times e^{i2\pi f_c(t-mT_c)} e^{i2\pi\left(\frac{B}{Tup}\right)(t-mT_c)^2} \quad (3)$$

A radar may determine the velocity of a target by detecting peaks in a doppler profile. The doppler profile may be obtained by a Fourier Transform (FFT) applied over samples across chirps 610. For example, an FFT may be performed over a sequence obtain by a first sample of each chirp 610 in a frame 615. An FFT may be performed similarly for additional chirp 610 samples. Movement (e.g., velocity) of a target (e.g., a ghost target) may be represented as a linear phase increase across chirps after mixing with the transmitted signal. The linear phase increase may appear as a peak in the doppler profile (e.g., the doppler spectrum). A radar may apply varying phases per chirp, and the phase across chirps of a frame may appear to be changing in a random manner, which may mask the linear phase increase due to the ghost target movement. As a result, the doppler profile may not have strong peaks due to ghost targets. The lack of strong peaks in the doppler profile may be similar to the absence of strong ghost target peaks as described with reference to the frequency diagram 520-*d* of FIG. 5.

A radar may select a random delay and/or phase pattern. For example, delays 410, as described with reference to FIG. 4, and phases 605 may correspond to random values. Additionally or alternatively, a UE may determine the delay and/or phase pattern. However, delay and/or phase values may be restricted to values set by the network, preconfigured values, or values from a codebook. In some cases, a delay and/or phase pattern may change between consecutive frames 615. In some other cases, a same delay and/or phase pattern may be used for all frames 615. Whether a delay and/or phase pattern changes between consecutive frames 615 may be pre-configured, configured by the network, or obtained from a codebook.

A radar may select a delay 410, as described with reference to FIG. 4, and/or phase 605 to apply to each chirp, individually. The radar may select the delays 410 and/or phases 605 for each chirp randomly from within a range from zero to a maximum delay, $\delta_{max}$. The maximum delay 410 and/or phase 605 may be large enough so that the resulting relative chirp (e.g., waveform) offset between any pair of interferers varies significantly and corresponding detections (e.g., ghost target detections) are filtered out. The maximum delay 410 and/or phase 605 may be pre-configured or may be provided (e.g., in real-time) by the network. In some cases, the maximum delay 410 and/or phase 605 may be configured via a vehicle-to-everything (V2X) link. Additionally or alternatively, a radar may select a delay 410 and/or phase 605 based on a deterministic delay and/or phase pattern. The deterministic delay and/or phase pattern may be selected from a pre-configured set of patterns (e.g., a codebook). In some cases, more than one codebook may be specified. The radar may receive an indication from the network (e.g., via a V2X link) indicating which codebook to consider and which pattern from the codebook to use.

In some cases, radars may determine to apply a delay and/or phase pattern based on whether the radars are operating in a specific geographical area. In some other cases, the network may transmit an indication to a radar, indicating that one or more delay and/or phase patterns should be applied. For example, a network measurement may indicate increased radar interference. The network may determine that radars should apply a delay and/or phase pattern to reduce the impact of interference. In some cases, a first radar may detect interference from a second radar. Additionally or alternatively, the second radar may detect interference from the first radar. The first and second radar may identify each other as mutually interfering and may transmit signaling to each other, indicating that a delay and/or phase pattern should be applied to minimize interference. Similarly, a plurality of radars may detect interference and transmit signaling to any interfering radars indicating that a delay and/or phase pattern should be applied to minimize interference.

Figure 7:
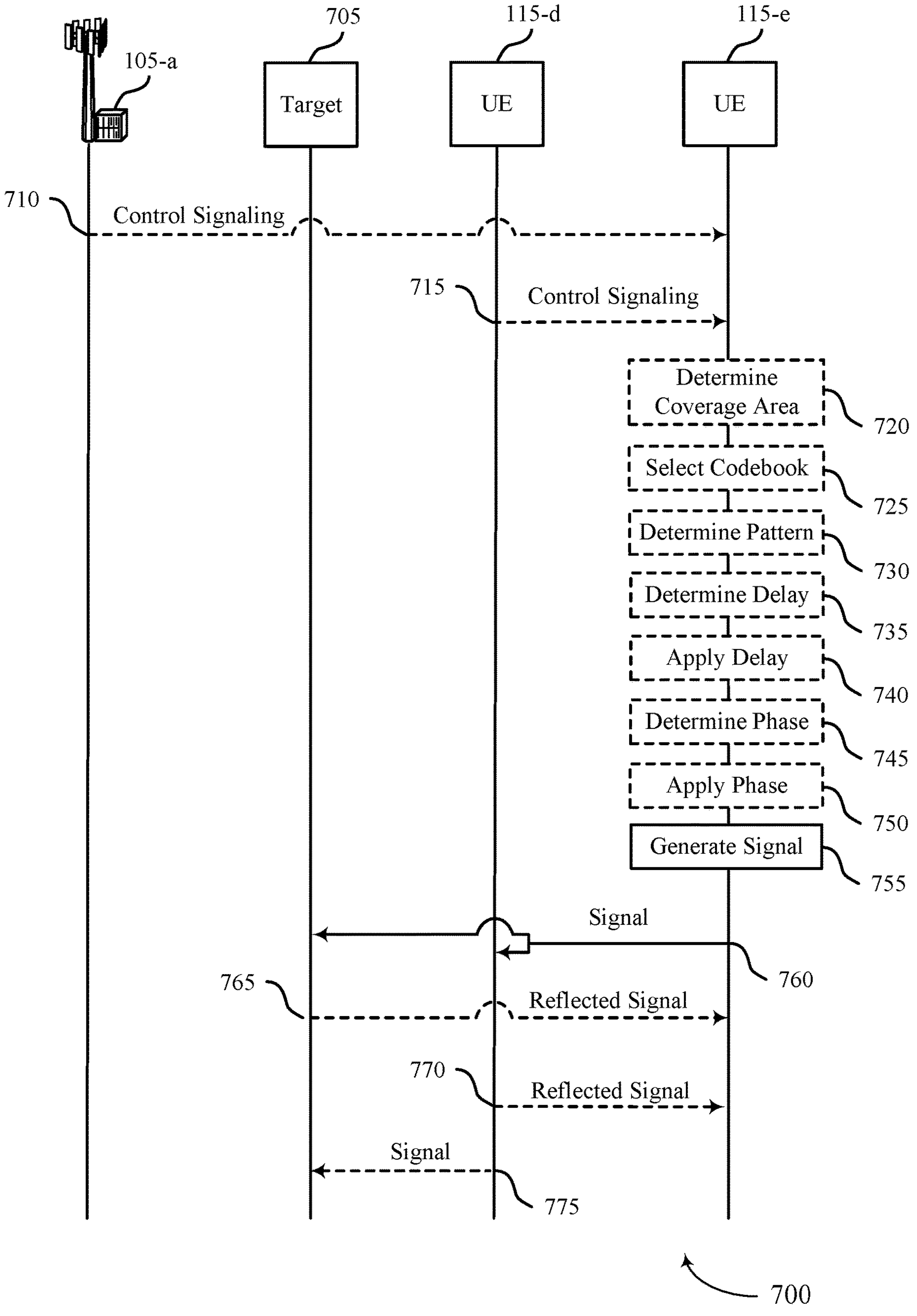
FIG. 7 illustrates an example of a process flow that supports techniques for managing multi-radar co-existence by varying delay and phase in accordance with aspects of the present disclosure.

FIG. 7 illustrates an example of a process flow 700 that supports techniques for managing multi-radar co-existence by varying delay and phase in accordance with aspects of the present disclosure. The process flow 700 may implement aspects of the wireless communications system 100, the wireless communications system 200, or both. For example, the process flow 700 may be implemented by a UE 115 as described with reference to FIGS. 1 and 2, or a base station 105 as described with reference to FIG. 1. In the following description of the process flow 700, operations between one or more devices (e.g., a base station 105, a UE 115) may occur in a different order or at different times than as shown. Some operations may also be omitted from the process flow 700, and other operations may be added to the process flow 700.

At 710, a UE 115-*e* may receive, from a base station 105-*a*, control signaling indicating one or more of a maximum delay value, a maximum phase value, a codebook, a mutual interference between a first device and a second device, and a waveform configuration. The waveform configuration may identify a pattern associated with at least one parameter of a set of parameters. The pattern may indicate a set of values associated with the at least one parameter.

At 715, the UE 115-*e* may receive, from a UE 115-*d*, control signaling indicating one or more of a maximum delay value, a maximum phase value, a codebook, a mutual interference between a first device and a second device, and a waveform configuration. One or more of the first device or the second device may include one or more of the base station 105-*a*, the UE 115-*d*, or the UE 115-*e*. The waveform configuration may identify a pattern associated with at least one parameter of a set of parameters. The pattern may indicate a set of values associated with the at least one parameter. At 720, the UE 115-*e* may determine a geographical coverage area associated with the UE 115-*e*. At 725, the UE 115-*e* may select the codebook from a plurality of codebooks.

At 730, the UE 115-*e* may determine a pattern associated with the at least one parameter of the set of parameters. The pattern may indicate a set of values associated with the at least one parameter. The value of the at least one parameter may be different for each respective waveform of the plurality of waveforms based on the set of values associated with the at least one parameter. In some cases, determining the pattern associated with the at least one parameter of the set of parameters may be based on the control signaling.

Determining the pattern associated with the at least one parameter of the set of parameters may additionally be based on a codebook. The codebook may identify the pattern associated with the at least one parameter of the set of parameters. The pattern may indicate the set of values associated with the at least one parameter. The UE 115-*e* may select a respective pattern from a plurality of patterns for each frame of the plurality of frames. Each respective pattern may be different for each frame of a plurality of frames. Determining the pattern associated with the at least one radar parameter of the set of radar parameters may be based on selecting the codebook from the plurality of codebooks.

At 735, the UE 115-*e* may determine a respective delay for each respective waveform of the plurality of waveforms associated with the at least one frame of the plurality of frames based on the waveform configuration. The respective delay may be different for each respective waveform of the plurality of waveforms. The UE 115-*e* may select the respective delay for each respective waveform of the plurality of waveforms associated with the at least one frame of the plurality of frames based on a randomness pattern indicated in the waveform configuration. Determining the respective delay for each respective waveform of the plurality of waveforms may be associated with the at least one frame of the plurality of frames based on the selecting. Selecting the respective delay for each respective waveform may include selecting, from a set of delay values, a respective value for the respective delay for each respective waveform of the plurality of waveforms associated with the at least one frame of the plurality of frames. The set of delay values may include one or more delay values including a minimum delay value and a maximum delay value. The UE 115-*e* may determine the maximum delay value based on the waveform configuration. The UE 115-*e* may determine, based on the pattern, one or more of a respective delay for each respective waveform of the plurality of waveforms associated with the frame or a respective phase for each respective waveform of the plurality of waveforms associated with the frame.

At 740, the UE 115-*e* may apply the respective delay for each respective waveform of the plurality of waveforms. In some cases, at least one respective delay associated with at least one waveform of the plurality of waveforms may correspond to a duration between a beginning of the at least one frame and a beginning of the at least one waveform. In some cases, at least one respective delay associated with a first waveform of the plurality of waveforms may correspond to a duration between a first ending of the first waveform of the plurality of waveforms and a second ending of a second waveform of the plurality of waveforms.

At 745, the UE 115-*e* may determine a respective phase for each respective waveform of the plurality of waveforms associated with the at least one frame of the plurality of frames based on the waveform configuration. In some cases, the respective phase may be different for each respective waveform of the plurality of waveforms. The UE 115-*e* may select the respective phase for each respective waveform of the plurality of waveforms associated with the at least one frame of the plurality of frames based on a randomness pattern indicated in the waveform configuration. The respective phase for each respective waveform of the plurality of waveforms associated with the at least one frame of the plurality of frames may bee based on the selecting. Selecting the phase may include selecting, from a set of phase values, a respective value for the respective phase for each respective waveform of the plurality of waveforms associated with the at least one frame of the plurality of frames. The set of phase values may include one or more phase values including a minimum phase value and a maximum phase value. Determining the maximum phase value may be based on the waveform configuration. In some cases, each respective phase associated with each waveform of the plurality of waveforms may correspond to a respective phase offset of a plurality of phase offsets. At 750, the UE 115-*e* may apply the respective phase for each respective waveform of the plurality of waveforms.

At 755, the UE 115-*e* may generate a radar signal including a plurality of waveforms based on a waveform configuration of the device. Each respective waveform of the plurality of waveforms may be associated with at least one parameter of a set of parameters. A value of the at least one parameter may be different for each respective waveform of the plurality of waveforms. In some examples, the UE 115-*e* may generate the radar signal based on applying the respective delay for each waveform of the plurality of waveforms. In some other examples, the UE 115-*e* may generate the radar signal based on applying the respective phase for each waveform of the plurality of waveforms. In other examples, the UE 115-*e* may generate the radar signal based on determining the pattern associated with the at least one parameter of the set of parameters. Additionally or alternatively, the UE 115-*e* may generate the radar signal based on applying one or more of the respective delay or the respective phase for each respective waveform of the plurality of waveforms associated with the frame.

In some examples, the UE 115-*e* may generate the radar signal based on selecting the respective pattern from the plurality of patterns for each frame of the plurality of frames. In some examples, the UE 115-*e* may select the waveform configuration to generate the radar signal, which may include the plurality of waveforms. Each respective waveform of the plurality of waveforms may be associated with at least one parameter of the set of parameters. The value of the at least one parameter may be different for each respective waveform of the plurality of waveforms. In some examples, the UE 115-*e* may generate the radar signal based on a geographical coverage area. In some examples, the UE 115-*e* may select the waveform configuration to generate the radar signal, which may include the plurality of waveforms. Each respective waveform of the plurality of waveforms may be associated with at least one parameter of the set of parameters. The value of the at least one parameter may be different for each respective waveform of the plurality of waveforms. The UE 115-*e* may also generate the radar signal based on a mutual interference.

At 760, the UE 115-*e* may transmit the generated radar signal during at least one frame of a plurality of frames. The UE 115-*e* may receive the radar signal during at least one frame of a plurality of frames. Additionally or alternatively, a target 705 may receive the radar signal. The radar signal may include a plurality of waveforms based on a waveform configuration. Each respective waveform of the plurality of waveforms may be associated with at least one parameter of a set of parameters. A value of the at least one parameter may be different for each respective waveform of the plurality of waveforms At 765, the target 705 may transmit a reflected radar signal during the at least one frame of the plurality of frames. Additionally or alternatively, at 770, the UE 115-*d* may transmit a reflected radar signal during the at least one frame of the plurality of frames. In some cases, a respective delay for each respective waveform of the plurality of waveforms may be associated with the at least one frame of the plurality of frames being different for each respective waveform of the plurality of waveforms. A respective phase for each respective waveform of the plurality of waveforms may be associated with the at least one frame of the plurality of frames being different for each respective waveform of the plurality of waveforms.

At 775, the UE 115-*d* may transmit a second radar signal during the at least one frame of a plurality of frames. The second radar signal may include a second plurality of waveforms. Each respective waveform of the second plurality of waveforms may be associated with the at least one parameter of the set of parameters. A second value of the at least one parameter may be different for each respective waveform of the second plurality of waveforms. The second value may be different than the value of the at least one parameter.

Figure 8:
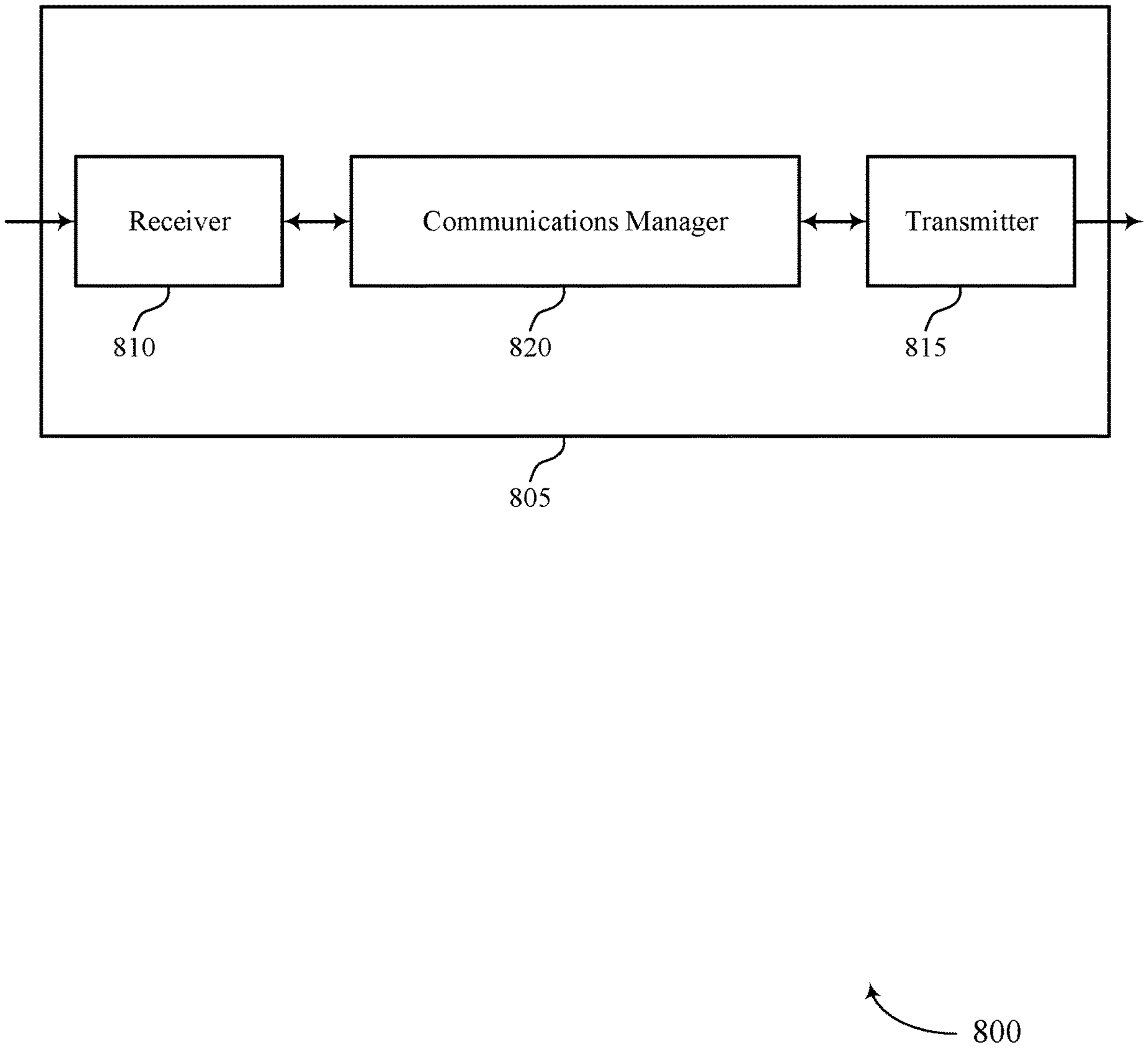
FIGS. 8 and 9 show block diagrams of devices that support techniques for managing multi-radar co-existence by varying delay and phase in accordance with aspects of the present disclosure.

FIG. 8 shows a block diagram 800 of a device 805 that supports techniques for managing multi-radar co-existence by varying delay and phase in accordance with aspects of the present disclosure. The device 805 may be an example of aspects of one or more of a base station 105 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for managing multi-radar co-existence by varying delay and phase). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for managing multi-radar co-existence by varying delay and phase). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for managing multi-radar co-existence by varying delay and phase as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at the device 805 in accordance with examples as disclosed herein. For example, the communications manager 820 may be configured as or otherwise support a means for generating a radar signal including a set of multiple waveforms based on a waveform configuration of the device, each respective waveform of the set of multiple waveforms associated with at least one parameter of a set of parameters, a value of the at least one parameter being different for each respective waveform of the set of multiple waveforms. The communications manager 820 may be configured as or otherwise support a means for transmitting the generated radar signal during at least one frame of a set of multiple frames.

Additionally or alternatively, the communications manager 820 may support wireless communication at the device 805 in accordance with examples as disclosed herein. For example, the communications manager 820 may be configured as or otherwise support a means for receiving a radar signal during at least one frame of a set of multiple frames, the radar signal including a set of multiple waveforms based on a waveform configuration, each respective waveform of the set of multiple waveforms associated with at least one parameter of a set of parameters, a value of the at least one parameter being different for each respective waveform of the set of multiple waveforms. The communications manager 820 may be configured as or otherwise support a means for transmitting a reflected radar signal during the at least one frame of the set of multiple frames.

By including or configuring the communications manager 820 in accordance with examples as described herein, the device 805 (e.g., a processor controlling or otherwise coupled to the receiver 810, the transmitter 815, the communications manager 820, or a combination thereof) may support techniques reduced power consumption.

Figure 9:
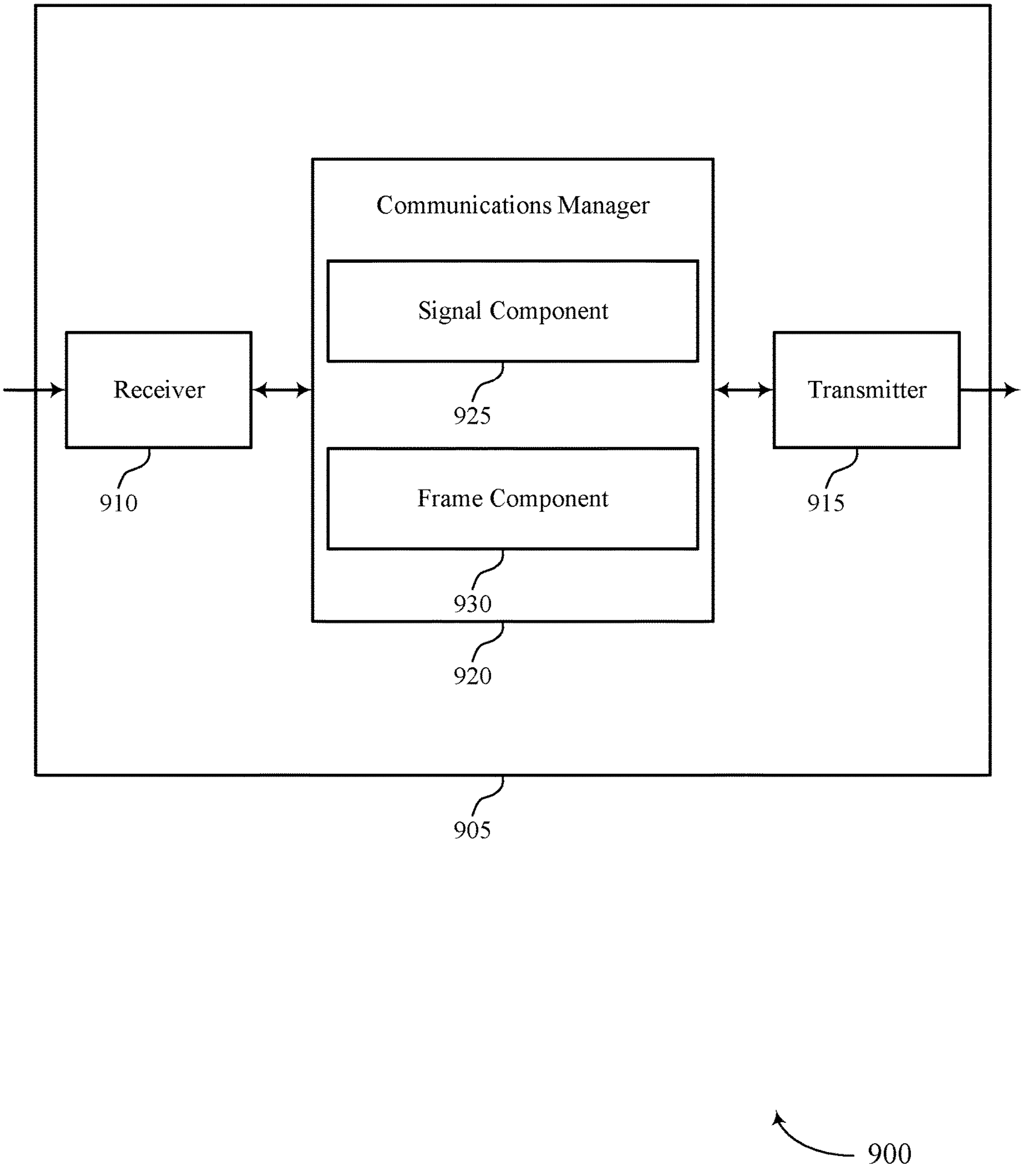

FIG. 9 shows a block diagram 900 of a device 905 that supports techniques for managing multi-radar co-existence by varying delay and phase in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for managing multi-radar co-existence by varying delay and phase). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for managing multi-radar co-existence by varying delay and phase). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for managing multi-radar co-existence by varying delay and phase as described herein. For example, the communications manager 920 may include a signal component 925 a frame component 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at the device 905 in accordance with examples as disclosed herein. The signal component 925 may be configured as or otherwise support a means for generating a radar signal including a set of multiple waveforms based on a waveform configuration of the device, each respective waveform of the set of multiple waveforms associated with at least one parameter of a set of parameters, a value of the at least one parameter being different for each respective waveform of the set of multiple waveforms. The frame component 930 may be configured as or otherwise support a means for transmitting the generated radar signal during at least one frame of a set of multiple frames.

Additionally or alternatively, the communications manager 920 may support wireless communication at the device 905 in accordance with examples as disclosed herein. The signal component 925 may be configured as or otherwise support a means for receiving a radar signal during at least one frame of a set of multiple frames, the radar signal including a set of multiple waveforms based on a waveform configuration, each respective waveform of the set of multiple waveforms associated with at least one parameter of a set of parameters, a value of the at least one parameter being different for each respective waveform of the set of multiple waveforms. The frame component 930 may be configured as or otherwise support a means for transmitting a reflected radar signal during the at least one frame of the set of multiple frames.

Figure 10:
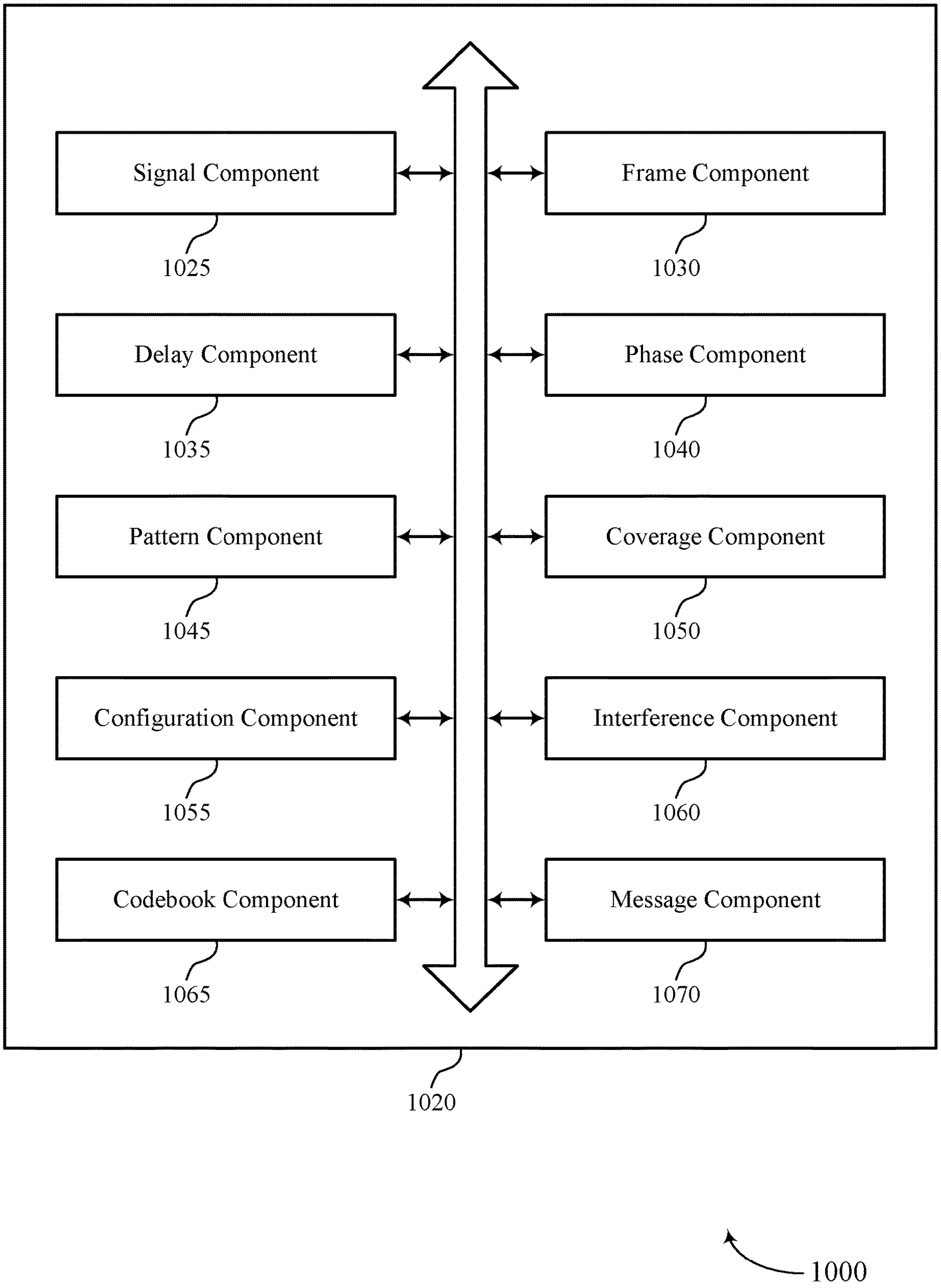
FIG. 10 shows a block diagram of a communications manager that supports techniques for managing multi-radar co-existence by varying delay and phase in accordance with aspects of the present disclosure.

FIG. 10 shows a block diagram 1000 of a communications manager 1020 that supports techniques for managing multi-radar co-existence by varying delay and phase in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for managing multi-radar co-existence by varying delay and phase as described herein. For example, the communications manager 1020 may include a signal component 1025, a frame component 1030, a delay component 1035, a phase component 1040, a pattern component 1045, a coverage component 1050, a configuration component 1055, an interference component 1060, a codebook component 1065, a message component 1070, or any combination thereof. Each of these components may communicate, directly or indirectly, with one another (e.g., via one or more buses).

The communications manager 1020 may support wireless communication at a device in accordance with examples as disclosed herein. The signal component 1025 may be configured as or otherwise support a means for generating a radar signal including a set of multiple waveforms based on a waveform configuration of the device, each respective waveform of the set of multiple waveforms associated with at least one parameter of a set of parameters, a value of the at least one parameter being different for each respective waveform of the set of multiple waveforms. The frame component 1030 may be configured as or otherwise support a means for transmitting the generated radar signal during at least one frame of a set of multiple frames.

In some examples, the delay component 1035 may be configured as or otherwise support a means for determining a respective delay for each respective waveform of the set of multiple waveforms associated with the at least one frame of the set of multiple frames based on the waveform configuration, the respective delay being different for each respective waveform of the set of multiple waveforms. In some examples, the delay component 1035 may be configured as or otherwise support a means for applying the respective delay for each respective waveform of the set of multiple waveforms. In some examples, the signal component 1025 may be configured as or otherwise support a means for generating the radar signal based on applying the respective delay for each waveform of the set of multiple waveforms.

In some examples, the delay component 1035 may be configured as or otherwise support a means for selecting the respective delay for each respective waveform of the set of multiple waveforms associated with the at least one frame of the set of multiple frames based on a randomness pattern indicated in the waveform configuration. In some examples, the delay component 1035 may be configured as or otherwise support a means for determining the respective delay for each respective waveform of the set of multiple waveforms associated with the at least one frame of the set of multiple frames based on the selecting.

In some examples, to support selecting the respective delay for each respective waveform, the delay component 1035 may be configured as or otherwise support a means for selecting, from a set of delay values, a respective value for the respective delay for each respective waveform of the set of multiple waveforms associated with the at least one frame of the set of multiple frames. In some examples, the set of delay values includes one or more delay values including a minimum delay value and a maximum delay value. In some examples, the message component 1070 may be configured as or otherwise support a means for receiving control signaling indicating the maximum delay value. In some examples, the message component 1070 may be configured as or otherwise support a means for determining the maximum delay value based on the waveform configuration.

In some examples, to support selecting the respective delay for each respective waveform, the phase component 1040 may be configured as or otherwise support a means for selecting, from a set of phase values, a respective value for the respective phase for each respective waveform of the set of multiple waveforms associated with the at least one frame of the set of multiple frames. In some examples, the set of phase values includes one or more phase values including a minimum phase value and a maximum phase value. In some examples, the message component 1070 may be configured as or otherwise support a means for receiving control signaling indicating the maximum phase value. In some examples, the message component 1070 may be configured as or otherwise support a means for determining the maximum phase value based on the waveform configuration.

In some examples, at least one respective delay associated with at least one waveform of the set of multiple waveforms corresponds to a duration between a beginning of the at least one frame and a beginning of the at least one waveform. In some examples, at least one respective delay associated with a first waveform of the set of multiple waveforms corresponds to a duration between a first ending of the first waveform of the set of multiple waveforms and a beginning of a second waveform of the set of multiple waveforms.

In some examples, the phase component 1040 may be configured as or otherwise support a means for determining a respective phase for each respective waveform of the set of multiple waveforms associated with the at least one frame of the set of multiple frames based on the waveform configuration, the respective phase being different for each respective waveform of the set of multiple waveforms. In some examples, the phase component 1040 may be configured as or otherwise support a means for applying the respective phase for each respective waveform of the set of multiple waveforms. In some examples, the signal component 1025 may be configured as or otherwise support a means for generating the radar signal based on applying the respective phase for each waveform of the set of multiple waveforms.

In some examples, the phase component 1040 may be configured as or otherwise support a means for selecting the respective phase for each respective waveform of the set of multiple waveforms associated with the at least one frame of the set of multiple frames based on a randomness pattern indicated in the waveform configuration. In some examples, the phase component 1040 may be configured as or otherwise support a means for determining the respective phase for each respective waveform of the set of multiple waveforms associated with the at least one frame of the set of multiple frames based on the selecting. In some examples, each respective phase associated with each waveform of the set of multiple waveforms corresponds to a respective phase offset of a set of multiple phase offsets.

In some examples, the pattern component 1045 may be configured as or otherwise support a means for determining a pattern associated with the at least one parameter of the set of parameters, the pattern indicating a set of values associated with the at least one parameter, the value of the at least one parameter being different for each respective waveform of the set of multiple waveforms based on the set of values associated with the at least one parameter. In some examples, the signal component 1025 may be configured as or otherwise support a means for generating the radar signal based on determining the pattern associated with the at least one parameter of the set of parameters.

In some examples, the delay component 1035 may be configured as or otherwise support a means for determining, based on the pattern, one or more of a respective delay for each respective waveform of the set of multiple waveforms associated with the frame or a respective phase for each respective waveform of the set of multiple waveforms associated with the frame. In some examples, the delay component 1035 may be configured as or otherwise support a means for applying one or more of the respective delay or the respective phase for each respective waveform of the set of multiple waveforms associated with the frame. In some examples, the signal component 1025 may be configured as or otherwise support a means for generating the radar signal based on applying one or more of the respective delay or the respective phase for each respective waveform of the set of multiple waveforms associated with the frame.

In some examples, the configuration component 1055 may be configured as or otherwise support a means for receiving control signaling indicating the waveform configuration, the waveform configuration identifying the pattern associated with the at least one parameter of the set of parameters, the pattern indicating the set of values associated with the at least one parameter. In some examples, the pattern component 1045 may be configured as or otherwise support a means for determining the pattern associated with the at least one parameter of the set of parameters based on the control signaling. In some examples, the pattern component 1045 may be configured as or otherwise support a means for determining the pattern associated with the at least one parameter of the set of parameters based on a codebook, the codebook identifying the pattern associated with the at least one parameter of the set of parameters, the pattern indicating the set of values associated with the at least one parameter.

In some examples, the codebook component 1065 may be configured as or otherwise support a means for receiving control signaling indicating the codebook. In some examples, the codebook component 1065 may be configured as or otherwise support a means for selecting the codebook from a set of multiple codebooks. In some examples, determining the pattern associated with the at least one parameter of the set of parameters may be based on selecting the codebook from the set of multiple codebooks. In some examples, the pattern component 1045 may be configured as or otherwise support a means for selecting a respective pattern from a set of multiple patterns for each frame of the set of multiple frames, each respective pattern being different for each frame of the set of multiple frames. In some examples, the signal component 1025 may be configured as or otherwise support a means for generating the radar signal based on selecting the respective pattern from the set of multiple patterns for each frame of the set of multiple frames.

In some examples, the coverage component 1050 may be configured as or otherwise support a means for determining a geographical coverage area associated with the device. In some examples, the configuration component 1055 may be configured as or otherwise support a means for selecting the waveform configuration to generate the radar signal including the set of multiple waveforms, each respective waveform of the set of multiple waveforms associated with at least one parameter of the set of parameters, the value of the at least one parameter being different for each respective waveform of the set of multiple waveforms, based on the geographical coverage area.

In some examples, the interference component 1060 may be configured as or otherwise support a means for receiving control signaling indicating a mutual interference between the device and a second device. In some examples, the configuration component 1055 may be configured as or otherwise support a means for selecting the waveform configuration to generate the radar signal including the set of multiple waveforms, each respective waveform of the set of multiple waveforms associated with at least one parameter of the set of parameters, the value of the at least one parameter being different for each respective waveform of the set of multiple waveforms, based on the mutual interference.

Additionally or alternatively, the communications manager 1020 may support wireless communication at a device in accordance with examples as disclosed herein. In some examples, the signal component 1025 may be configured as or otherwise support a means for receiving a radar signal during at least one frame of a set of multiple frames, the radar signal including a set of multiple waveforms based on a waveform configuration, each respective waveform of the set of multiple waveforms associated with at least one parameter of a set of parameters, a value of the at least one parameter being different for each respective waveform of the set of multiple waveforms. In some examples, the frame component 1030 may be configured as or otherwise support a means for transmitting a reflected radar signal during the at least one frame of the set of multiple frames.

In some examples, a respective delay for each respective waveform of the set of multiple waveforms associated with the at least one frame of the set of multiple frames being different for each respective waveform of the set of multiple waveforms. In some examples, a respective phase for each respective waveform of the set of multiple waveforms associated with the at least one frame of the set of multiple frames being different for each respective waveform of the set of multiple waveforms.

In some examples, the configuration component 1055 may be configured as or otherwise support a means for transmitting a second radar signal during the at least one frame of a set of multiple frames, the second radar signal including a second set of multiple waveforms, each respective waveform of the second set of multiple waveforms associated with the at least one parameter of the set of parameters, a second value of the at least one parameter being different for each respective waveform of the second set of multiple waveforms, the second value different than the value of the at least one parameter.

Figure 11:
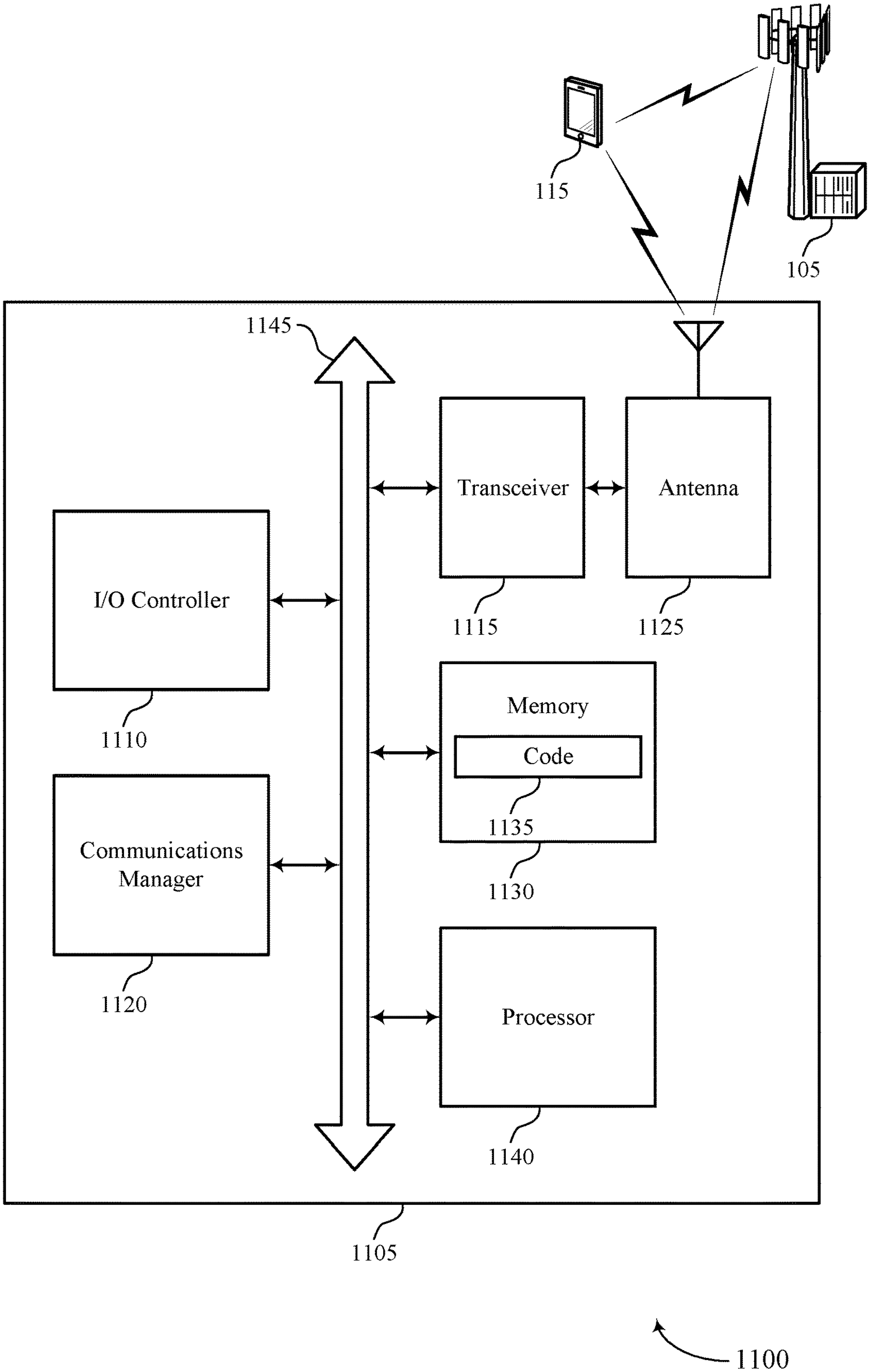
FIG. 11 shows a diagram of a system including a device that supports techniques for managing multi-radar co-existence by varying delay and phase in accordance with aspects of the present disclosure.

FIG. 11 shows a diagram of a system 1100 including a device 1105 that supports techniques for managing multi-radar co-existence by varying delay and phase in accordance with aspects of the present disclosure. The device 1105 may be an example of or include the components of a device 805, a device 905, a base station 105, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for managing multi-radar co-existence by varying delay and phase). For example, the device 1105 or a component of the device 1105 may include a processor 1140 and memory 1130 coupled to the processor 1140, the processor 1140 and memory 1130 configured to perform various functions described herein.

The communications manager 1120 may support wireless communication at the device 1105 in accordance with examples as disclosed herein. For example, the communications manager 1120 may be configured as or otherwise support a means for generating a radar signal including a set of multiple waveforms based on a waveform configuration of the device, each respective waveform of the set of multiple waveforms associated with at least one parameter of a set of parameters, a value of the at least one parameter being different for each respective waveform of the set of multiple waveforms. The communications manager 1120 may be configured as or otherwise support a means for transmitting the generated radar signal during at least one frame of a set of multiple frames.

Additionally or alternatively, the communications manager 1120 may support wireless communication at the device 1105 in accordance with examples as disclosed herein. For example, the communications manager 1120 may be configured as or otherwise support a means for receiving a radar signal during at least one frame of a set of multiple frames, the radar signal including a set of multiple waveforms based on a waveform configuration, each respective waveform of the set of multiple waveforms associated with at least one parameter of a set of parameters, a value of the at least one parameter being different for each respective waveform of the set of multiple waveforms. The communications manager 1120 may be configured as or otherwise support a means for transmitting a reflected radar signal during the at least one frame of the set of multiple frames.

By including or configuring the communications manager 1120 in accordance with examples as described herein, the device 1105 may support techniques for improved communication reliability, reduced latency, and improved coordination between devices.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for managing multi-radar co-existence by varying delay and phase as described herein, or the processor 1140 and the memory 1130 may be otherwise configured to perform or support such operations.

Figure 12:
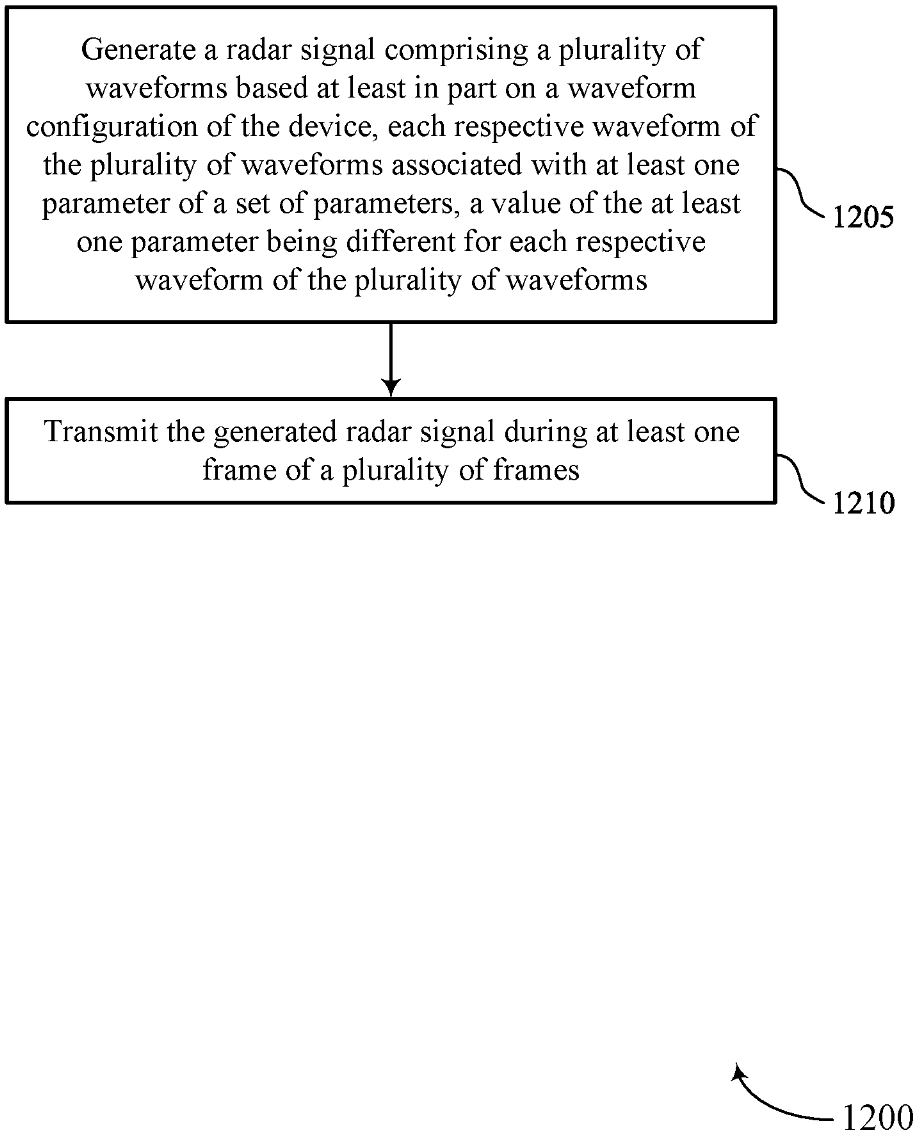
FIGS. 12 through 15 show flowcharts illustrating methods that support techniques for managing multi-radar co-existence by varying delay and phase in accordance with aspects of the present disclosure.

FIG. 12 shows a flowchart illustrating a method 1200 that supports techniques for managing multi-radar co-existence by varying delay and phase in accordance with aspects of the present disclosure. The operations of the method 1200 may be implemented by a device or its components as described herein. For example, the operations of the method 1200 may be performed by a device as described with reference to FIGS. 1 through 11. In some examples, a device may execute a set of instructions to control the functional elements of the device to perform the described functions. Additionally or alternatively, a device may perform aspects of the described functions using special-purpose hardware.

At 1205, the method may include generating a radar signal including a set of multiple waveforms based on a waveform configuration of the device, each respective waveform of the set of multiple waveforms associated with at least one parameter of a set of parameters, a value of the at least one parameter being different for each respective waveform of the set of multiple waveforms. The operations of 1205 may be performed in accordance with examples as disclosed herein. In some examples, aspects of the operations of 1205 may be performed by a signal component 1025 as described with reference to FIG. 10.

At 1210, the method may include transmitting the generated radar signal during at least one frame of a set of multiple frames. The operations of 1210 may be performed in accordance with examples as disclosed herein. In some examples, aspects of the operations of 1210 may be performed by a frame component 1030 as described with reference to FIG. 10.

Figure 13:
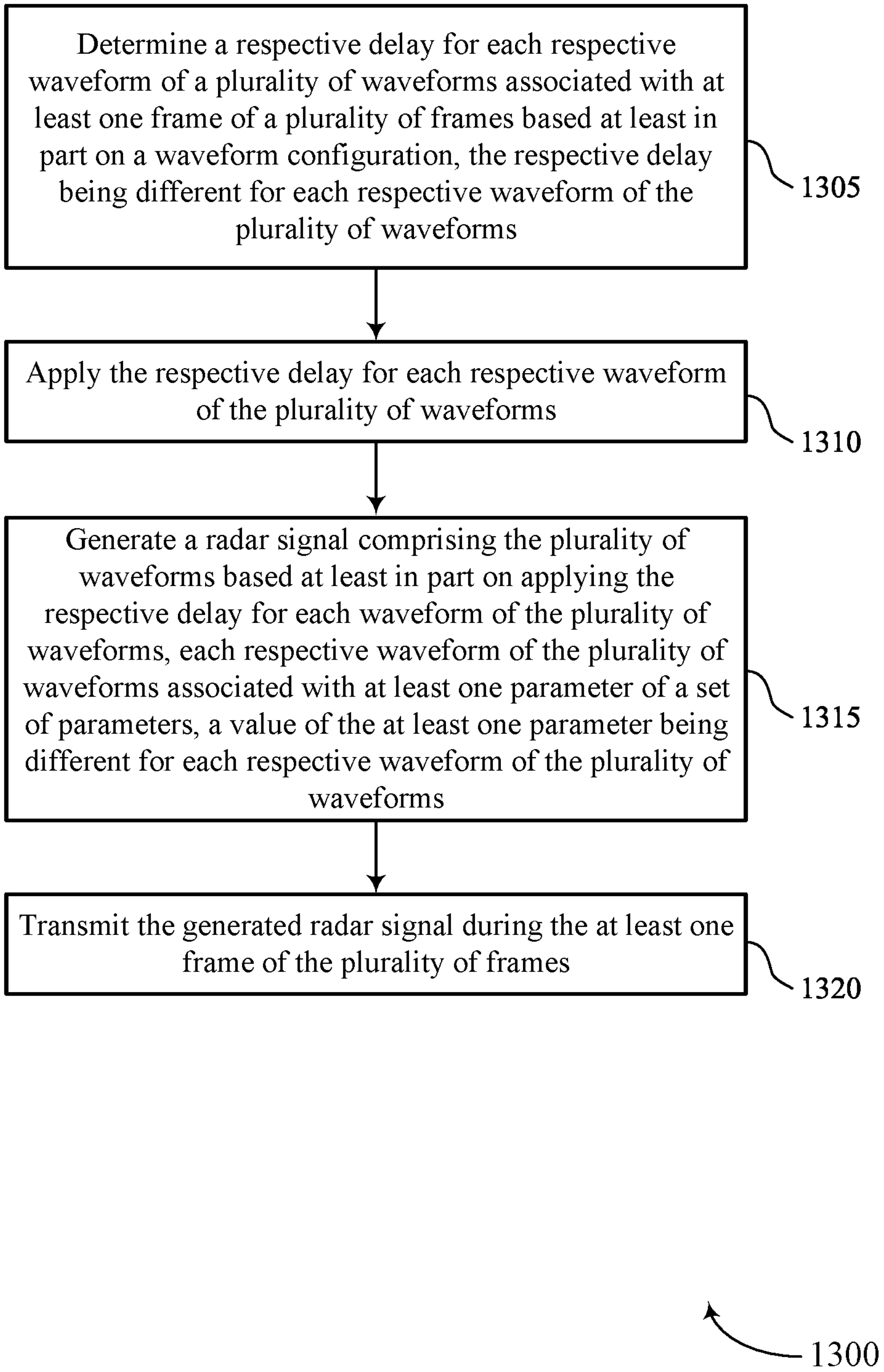

FIG. 13 shows a flowchart illustrating a method 1300 that supports techniques for managing multi-radar co-existence by varying delay and phase in accordance with aspects of the present disclosure. The operations of the method 1300 may be implemented by a device or its components as described herein. For example, the operations of the method 1300 may be performed by a device as described with reference to FIGS. 1 through 11. In some examples, a device may execute a set of instructions to control the functional elements of the device to perform the described functions. Additionally or alternatively, a device may perform aspects of the described functions using special-purpose hardware.

At 1305, the method may include determining a respective delay for each respective waveform of a set of waveforms associated with at least one frame of a set of frames based at least in part on a waveform configuration, the respective delay being different for each respective waveform of the set of waveforms. The operations of 1305 may be performed in accordance with examples as disclosed herein. In some examples, aspects of the operations of 1305 may be performed by a delay component 1035 as described with reference to FIG. 10.

At 1310, the method may include applying the respective delay for each respective waveform of the set of waveforms. The operations of 1310 may be performed in accordance with examples as disclosed herein. In some examples, aspects of the operations of 1310 may be performed by a delay component 1035 as described with reference to FIG. 10.

At 1315, the method may include generating a radar signal including the set of waveforms based at least in part on applying the respective delay for each waveform of the set of waveforms, each respective waveform of the set of waveforms associated with at least one parameter of a set of parameters, a value of the at least one parameter being different for each respective waveform of the set of waveforms. The operations of 1315 may be performed in accordance with examples as disclosed herein. In some examples, aspects of the operations of 1315 may be performed by a signal component 1025 as described with reference to FIG. 10.

At 1320, the method may include transmitting the generated radar signal during the at least one frame of the set of multiple frames. The operations of 1320 may be performed in accordance with examples as disclosed herein. In some examples, aspects of the operations of 1320 may be performed by a frame component 1030 as described with reference to FIG. 10.

Figure 14:
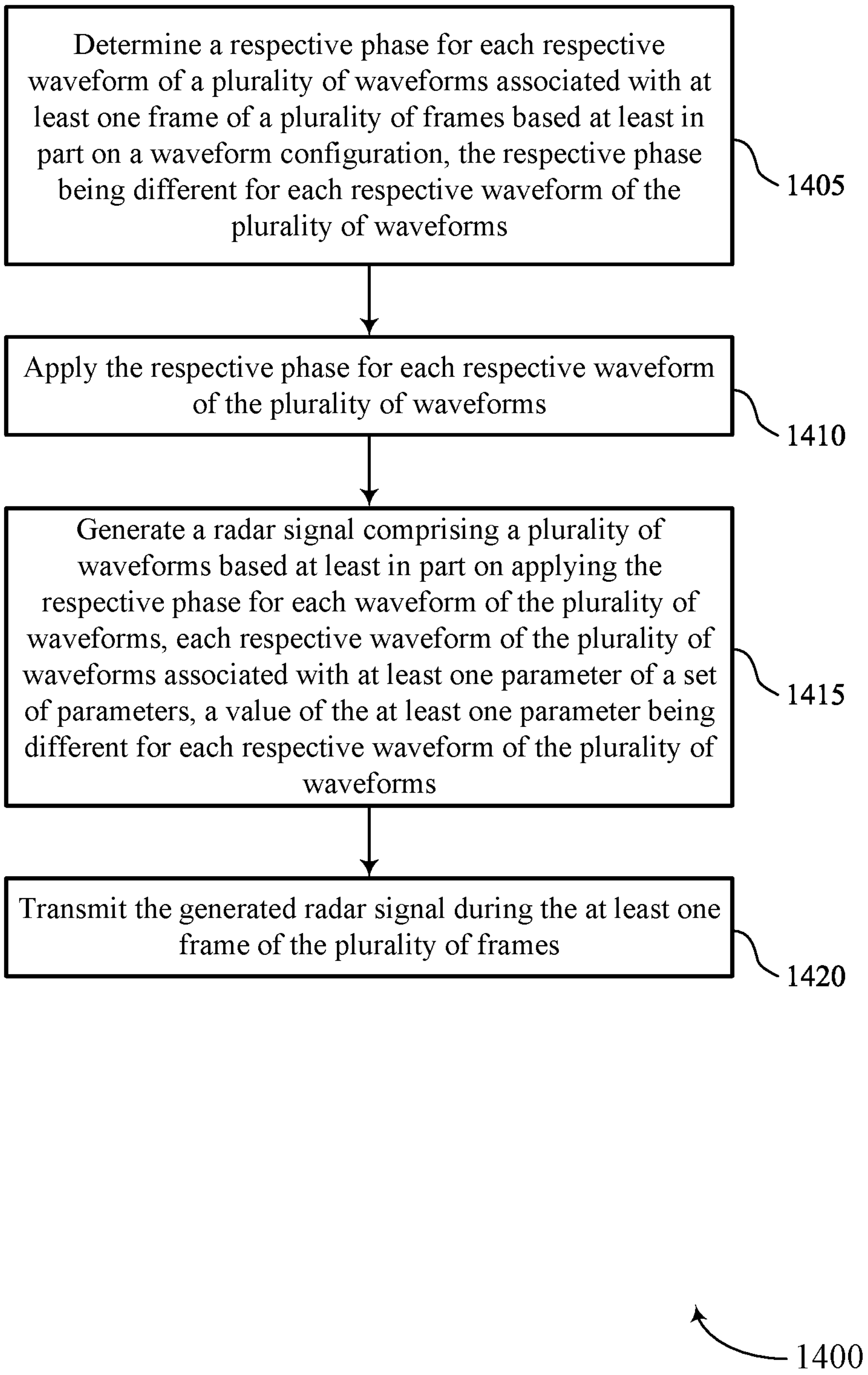

FIG. 14 shows a flowchart illustrating a method 1400 that supports techniques for managing multi-radar co-existence by varying delay and phase in accordance with aspects of the present disclosure. The operations of the method 1400 may be implemented by a device or its components as described herein. For example, the operations of the method 1400 may be performed by a device as described with reference to FIGS. 1 through 11. In some examples, a device may execute a set of instructions to control the functional elements of the device to perform the described functions. Additionally or alternatively, a device may perform aspects of the described functions using special-purpose hardware.

At 1405, the method may include determining a respective phase for each respective waveform of a set of waveforms associated with at least one frame of a set of frames based at least in part on a waveform configuration, the respective phase being different for each respective waveform of the set of waveforms. The operations of 1405 may be performed in accordance with examples as disclosed herein. In some examples, aspects of the operations of 1405 may be performed by a phase component 1040 as described with reference to FIG. 10.

At 1410, the method may include applying the respective phase for each respective waveform of the set of multiple waveforms. The operations of 1410 may be performed in accordance with examples as disclosed herein. In some examples, aspects of the operations of 1410 may be performed by a phase component 1040 as described with reference to FIG. 10.

At 1415, the method may include generating a radar signal including a set of waveforms based at least in part on applying the respective phase for each waveform of the set of waveforms, each respective waveform of the set of waveforms associated with at least one parameter of a set of parameters, a value of the at least one parameter being different for each respective waveform of the set of waveforms. The operations of 1415 may be performed in accordance with examples as disclosed herein. In some examples, aspects of the operations of 1415 may be performed by a signal component 1025 as described with reference to FIG. 10.

At 1420, the method may include transmitting the generated radar signal during the at least one frame of the set of multiple frames. The operations of 1420 may be performed in accordance with examples as disclosed herein. In some examples, aspects of the operations of 1420 may be performed by a frame component 1030 as described with reference to FIG. 10.

Figure 15:
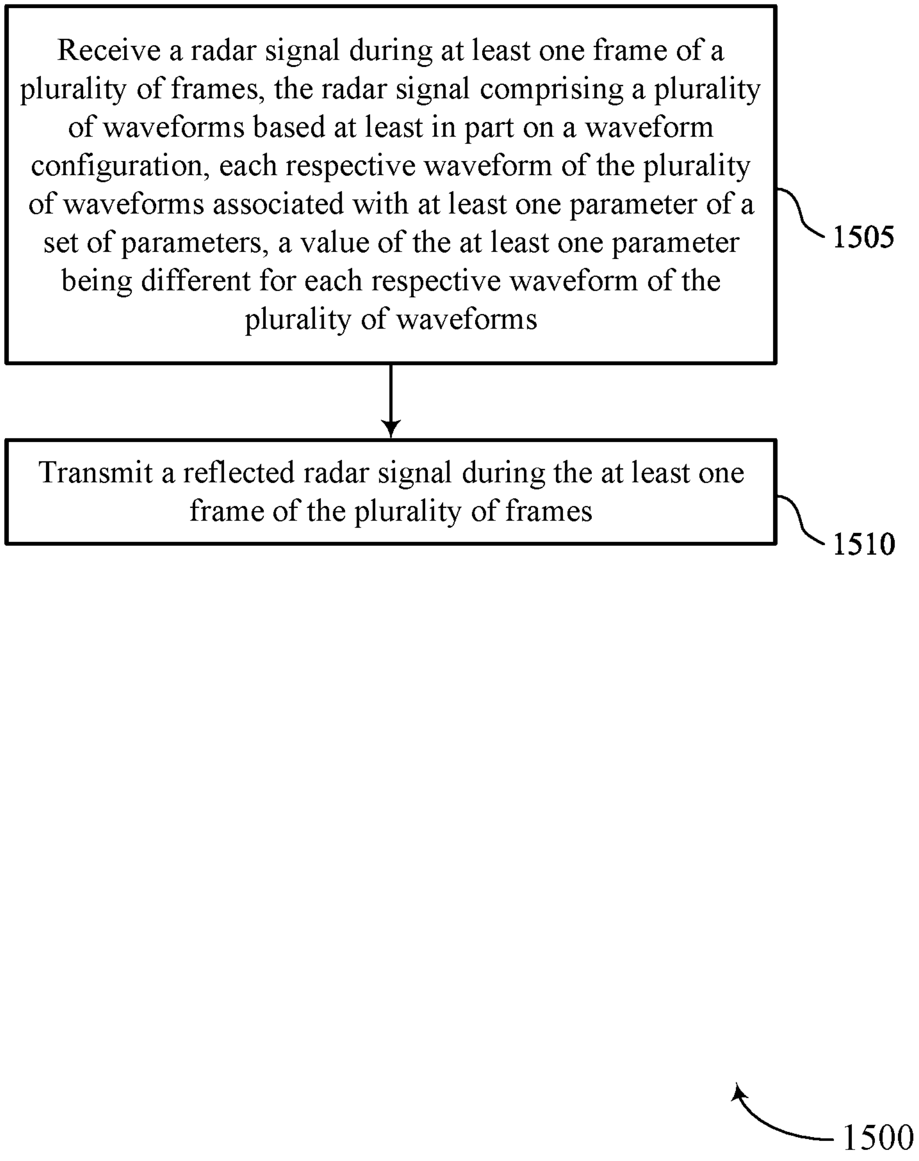

FIG. 15 shows a flowchart illustrating a method 1500 that supports techniques for managing multi-radar co-existence by varying delay and phase in accordance with aspects of the present disclosure. The operations of the method 1500 may be implemented by a device or its components as described herein. For example, the operations of the method 1500 may be performed by a device as described with reference to FIGS. 1 through 11. In some examples, a device may execute a set of instructions to control the functional elements of the device to perform the described functions. Additionally or alternatively, a device may perform aspects of the described functions using special-purpose hardware.

At 1505, the method may include receiving a radar signal during at least one frame of a set of multiple frames, the radar signal including a set of multiple waveforms based on a waveform configuration, each respective waveform of the set of multiple waveforms associated with at least one parameter of a set of parameters, a value of the at least one parameter being different for each respective waveform of the set of multiple waveforms. The operations of 1505 may be performed in accordance with examples as disclosed herein. In some examples, aspects of the operations of 1505 may be performed by a signal component 1025 as described with reference to FIG. 10.

At 1510, the method may include transmitting a reflected radar signal during the at least one frame of the set of multiple frames. The operations of 1510 may be performed in accordance with examples as disclosed herein. In some examples, aspects of the operations of 1510 may be performed by a frame component 1030 as described with reference to FIG. 10.

The following provides an overview of aspects of the present disclosure:

Aspect 1: A method for wireless communication at a device, comprising: generating a radar signal comprising a plurality of waveforms based at least in part on a waveform configuration of the device, each respective waveform of the plurality of waveforms associated with at least one parameter of a set of parameters, a value of the at least one parameter being different for each respective waveform of the plurality of waveforms; and transmitting the generated radar signal during at least one frame of a plurality of frames.

Aspect 2: The method of aspect 1, further comprising: determining a respective delay for each respective waveform of the plurality of waveforms associated with the at least one frame of the plurality of frames based at least in part on the waveform configuration, the respective delay being different for each respective waveform of the plurality of waveforms; and applying the respective delay for each respective waveform of the plurality of waveforms, wherein generating the radar signal is based at least in part on applying the respective delay for each waveform of the plurality of waveforms.

Aspect 3: The method of aspect 2, further comprising: selecting the respective delay for each respective waveform of the plurality of waveforms associated with the at least one frame of the plurality of frames based at least in part on a randomness pattern indicated in the waveform configuration, wherein determining the respective delay for each respective waveform of the plurality of waveforms associated with the at least one frame of the plurality of frames is based at least in part on the selecting.

Aspect 4: The method of aspect 3, wherein selecting the respective delay for each respective waveform comprises: selecting, from a set of delay values, a respective value for the respective delay for each respective waveform of the plurality of waveforms associated with the at least one frame of the plurality of frames.

Aspect 5: The method of aspect 4, wherein the set of delay values comprises one or more delay values including a minimum delay value and a maximum delay value.

Aspect 6: The method of aspect 5, further comprising: receiving control signaling indicating the maximum delay value.

Aspect 7: The method of any of aspects 5 through 6, further comprising: determining the maximum delay value based at least in part on the waveform configuration.

Aspect 8: The method of any of aspects 3 through 7, wherein selecting the respective delay for each respective waveform comprises: selecting, from a set of phase values, a respective value for the respective phase for each respective waveform of the plurality of waveforms associated with the at least one frame of the plurality of frames.

Aspect 9: The method of aspect 8, wherein the set of phase values comprises one or more phase values including a minimum phase value and a maximum phase value.

Aspect 10: The method of aspect 9, further comprising: receiving control signaling indicating the maximum phase value.

Aspect 11: The method of any of aspects 9 through 10, further comprising: determining the maximum phase value based at least in part on the waveform configuration.

Aspect 12: The method of any of aspects 1 through 11, wherein at least one respective delay associated with at least one waveform of the plurality of waveforms corresponds to a duration between a beginning of the at least one frame and a beginning of the at least one waveform.

Aspect 13: The method of any of aspects 1 through 12, wherein at least one respective delay associated with a first waveform of the plurality of waveforms corresponds to a duration between a first ending of the first waveform of the plurality of waveforms and a beginning of a second waveform of the plurality of waveforms.

Aspect 14: The method of any of aspects 1 through 13, further comprising: determining a respective phase for each respective waveform of the plurality of waveforms associated with the at least one frame of the plurality of frames based at least in part on the waveform configuration, the respective phase being different for each respective waveform of the plurality of waveforms; and applying the respective phase for each respective waveform of the plurality of waveforms, wherein generating the radar signal is based at least in part on applying the respective phase for each waveform of the plurality of waveforms.

Aspect 15: The method of aspect 14, further comprising: selecting the respective phase for each respective waveform of the plurality of waveforms associated with the at least one frame of the plurality of frames based at least in part on a randomness pattern indicated in the waveform configuration, wherein determining the respective phase for each respective waveform of the plurality of waveforms associated with the at least one frame of the plurality of frames is based at least in part on the selecting.

Aspect 16: The method of any of aspects 14 through 15, wherein each respective phase associated with each waveform of the plurality of waveforms corresponds to a respective phase offset of a plurality of phase offsets.

Aspect 17: The method of any of aspects 1 through 16, further comprising: determining a pattern associated with the at least one parameter of the set of parameters, the pattern indicating a set of values associated with the at least one parameter, the value of the at least one parameter being different for each respective waveform of the plurality of waveforms based at least in part on the set of values associated with the at least one parameter, wherein generating the radar signal is based at least in part on determining the pattern associated with the at least one parameter of the set of parameters.

Aspect 18: The method of aspect 17, further comprising: determining, based at least in part on the pattern, one or more of a respective delay for each respective waveform of the plurality of waveforms associated with the frame or a respective phase for each respective waveform of the plurality of waveforms associated with the frame; and applying one or more of the respective delay or the respective phase for each respective waveform of the plurality of waveforms associated with the frame, wherein generating the radar signal is based at least in part on applying one or more of the respective delay or the respective phase for each respective waveform of the plurality of waveforms associated with the frame.

Aspect 19: The method of any of aspects 17 through 18, further comprising: receiving control signaling indicating the waveform configuration, the waveform configuration identifying the pattern associated with the at least one parameter of the set of parameters, the pattern indicating the set of values associated with the at least one parameter, wherein determining the pattern associated with the at least one parameter of the set of parameters is based at least in part on the control signaling.

Aspect 20: The method of any of aspects 17 through 19, further comprising: determining the pattern associated with the at least one parameter of the set of parameters based at least in part on a codebook, the codebook identifying the pattern associated with the at least one parameter of the set of parameters, the pattern indicating the set of values associated with the at least one parameter.

Aspect 21: The method of aspect 20, further comprising: receiving control signaling indicating the codebook; and selecting the codebook from a plurality of codebooks, wherein determining the pattern associated with the at least one parameter of the set of parameters is based at least in part on selecting the codebook from the plurality of codebooks.

Aspect 22: The method of any of aspects 17 through 21, further comprising: selecting a respective pattern from a plurality of patterns for each frame of the plurality of frames, each respective pattern being different for each frame of the plurality of frames, wherein generating the radar signal is based at least in part on selecting the respective pattern from the plurality of patterns for each frame of the plurality of frames.

Aspect 23: The method of any of aspects 1 through 22, further comprising: determining a geographical coverage area associated with the device; and selecting the waveform configuration to generate the radar signal comprising the plurality of waveforms, each respective waveform of the plurality of waveforms associated with at least one parameter of the set of parameters, the value of the at least one parameter being different for each respective waveform of the plurality of waveforms, based at least in part on the geographical coverage area.

Aspect 24: The method of any of aspects 1 through 23, further comprising: receiving control signaling indicating a mutual interference between the device and a second device; and selecting the waveform configuration to generate the radar signal comprising the plurality of waveforms, each respective waveform of the plurality of waveforms associated with at least one parameter of the set of parameters, the value of the at least one parameter being different for each respective waveform of the plurality of waveforms, based at least in part on the mutual interference.

Aspect 25: A method for wireless communication at a device, comprising: receiving a radar signal during at least one frame of a plurality of frames, the radar signal comprising a plurality of waveforms based at least in part on a waveform configuration, each respective waveform of the plurality of waveforms associated with at least one parameter of a set of parameters, a value of the at least one parameter being different for each respective waveform of the plurality of waveforms; and transmitting a reflected radar signal during the at least one frame of the plurality of frames.

Aspect 26: The method of aspect 25, wherein a respective delay for each respective waveform of the plurality of waveforms associated with the at least one frame of the plurality of frames being different for each respective waveform of the plurality of waveforms.

Aspect 27: The method of any of aspects 25 through 26, wherein a respective phase for each respective waveform of the plurality of waveforms associated with the at least one frame of the plurality of frames being different for each respective waveform of the plurality of waveforms.

Aspect 28: The method of any of aspects 25 through 27, further comprising: transmitting a second radar signal during the at least one frame of a plurality of frames, the second radar signal comprising a second plurality of waveforms, each respective waveform of the second plurality of waveforms associated with the at least one parameter of the set of parameters, a second value of the at least one parameter being different for each respective waveform of the second plurality of waveforms, the second value different than the value of the at least one parameter.

Aspect 29: An apparatus for wireless communication at a device, comprising a processor; memory coupled with the processor; and instructions stored in the memory and executable by the processor to cause the apparatus to perform a method of any of aspects 1 through 24.

Aspect 30: An apparatus for wireless communication at a device, comprising at least one means for performing a method of any of aspects 1 through 24.

Aspect 31: A non-transitory computer-readable medium storing code for wireless communication at a device, the code comprising instructions executable by a processor to perform a method of any of aspects 1 through 24.

Aspect 32: An apparatus for wireless communication at a device, comprising a processor; memory coupled with the processor; and instructions stored in the memory and executable by the processor to cause the apparatus to perform a method of any of aspects 25 through 28.

Aspect 33: An apparatus for wireless communication at a device, comprising at least one means for performing a method of any of aspects 25 through 28.

Aspect 34: A non-transitory computer-readable medium storing code for wireless communication at a device, the code comprising instructions executable by a processor to perform a method of any of aspects 25 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a device, comprising:

receiving control signaling indicating a waveform configuration, the waveform configuration identifying a pattern associated with at least one parameter of a set of parameters, the pattern indicating a set of values associated with the at least one parameter, wherein the set of values comprises a set of delay values;

selecting a respective delay based at least in part on a respective delay value of the set of delay values for each respective waveform of a plurality of waveforms associated with at least one frame of a plurality of frames based at least in part on the waveform configuration, the respective delay being different for each respective waveform of the plurality of waveforms;

applying the respective delay for each respective waveform of the plurality of waveforms;

generating, based at least in part on applying the respective delay for each waveform of the plurality of waveforms, a radar signal comprising the plurality of waveforms based at least in part on the waveform configuration of the device, each respective waveform of the plurality of waveforms associated with the at least one parameter of the set of parameters, wherein a respective delay value is a value of the at least one parameter; and transmitting the generated radar signal during the at least one frame of the plurality of frames.

2. The method of claim 1, further comprising:

selecting the respective delay for each respective waveform of the plurality of waveforms associated with the at least one frame of the plurality of frames based at least in part on a respective pattern indicated in the waveform configuration.

3. The method of claim 2, wherein the set of delay values comprises one or more delay values including a minimum delay value and a maximum delay value.

4. The method of claim 3, wherein the control signaling indicates the maximum delay value.

5. The method of claim 3, further comprising:

determining the maximum delay value based at least in part on the waveform configuration.

6. The method of claim 2, wherein selecting the respective delay for each respective waveform comprises:

selecting, from a set of phase values, a respective value for the respective phase for each respective waveform of the plurality of waveforms associated with the at least one frame of the plurality of frames.

7. The method of claim 6, wherein the set of phase values comprises one or more phase values including a minimum phase value and a maximum phase value.

8. The method of claim 7, wherein the control signaling indicates the maximum phase value.

9. The method of claim 7, further comprising:

determining the maximum phase value based at least in part on the waveform configuration.

10. The method of claim 1, wherein at least one respective delay associated with at least one waveform of the plurality of waveforms corresponds to a duration between a beginning of the at least one frame and a beginning of the at least one waveform.

11. The method of claim 1, wherein at least one respective delay associated with a first waveform of the plurality of waveforms corresponds to a duration between a first ending of the first waveform of the plurality of waveforms and a beginning of a second waveform of the plurality of waveforms.

12. The method of claim 1, further comprising:

determining a respective phase for each respective waveform of the plurality of waveforms associated with the at least one frame of the plurality of frames based at least in part on the waveform configuration, the respective phase being different for each respective waveform of the plurality of waveforms; and applying the respective phase for each respective waveform of the plurality of waveforms, wherein generating the radar signal is based at least in part on applying the respective phase for each waveform of the plurality of waveforms.

13. The method of claim 12, further comprising:

selecting the respective phase for each respective waveform of the plurality of waveforms associated with the at least one frame of the plurality of frames based at least in part on a respective pattern indicated in the waveform configuration, wherein determining the respective phase for each respective waveform of the plurality of waveforms associated with the at least one frame of the plurality of frames is based at least in part on the selecting.

14. The method of claim 12, wherein each respective phase associated with each waveform of the plurality of waveforms corresponds to a respective phase offset of a plurality of phase offsets.

15. The method of claim 1, further comprising:

determining a pattern associated with the at least one parameter of the set of parameters, the pattern indicating the set of values associated with the at least one parameter, the value of the at least one parameter being different for each respective waveform of the plurality of waveforms based at least in part on the set of values associated with the at least one parameter, wherein generating the radar signal is based at least in part on determining the pattern associated with the at least one parameter of the set of parameters.

16. The method of claim 15, further comprising:

determining, based at least in part on the pattern, one or more of the respective delay for each respective waveform of the plurality of waveforms associated with the at least one frame of the plurality of frames, or a respective phase for each respective waveform of the plurality of waveforms associated with the at least one frame of the plurality of frames; and applying one or more of the respective delay or the respective phase for each respective waveform of the plurality of waveforms associated with the at least one frame, wherein generating the radar signal is based at least in part on applying one or more of the respective delay or the respective phase for each respective waveform of the plurality of waveforms associated with the at least one frame.

17. The method of claim 15, wherein determining the pattern associated with the at least one parameter of the set of parameters is based at least in part on the control signaling.

18. The method of claim 15, further comprising:

determining the pattern associated with the at least one parameter of the set of parameters based at least in part on a codebook, the codebook identifying the pattern associated with the at least one parameter of the set of parameters, the pattern indicating the set of values associated with the at least one parameter.

19. The method of claim 18, further comprising:

receiving control signaling indicating the codebook; and selecting the codebook from a plurality of codebooks, wherein determining the pattern associated with the at least one parameter of the set of parameters is based at least in part on selecting the codebook from the plurality of codebooks.

20. The method of claim 15, further comprising:

selecting a respective pattern from a plurality of patterns for each frame of the plurality of frames, each respective pattern being different for each frame of the plurality of frames, wherein generating the radar signal is based at least in part on selecting the respective pattern from the plurality of patterns for each frame of the plurality of frames.

21. The method of claim 1, further comprising:

determining a geographical coverage area associated with the device; and selecting the waveform configuration to generate the radar signal comprising the plurality of waveforms, each respective waveform of the plurality of waveforms associated with at least one parameter of the set of parameters, the value of the at least one parameter being different for each respective waveform of the plurality of waveforms, based at least in part on the geographical coverage area.

22. The method of claim 1, further comprising:

receiving control signaling indicating a mutual interference between the device and a second device; and selecting the waveform configuration to generate the radar signal comprising the plurality of waveforms, each respective waveform of the plurality of waveforms associated with at least one parameter of the set of parameters, the value of the at least one parameter being different for each respective waveform of the plurality of waveforms, based at least in part on the mutual interference.

23. A method for wireless communication at a device, comprising:

transmitting control signaling indicating a waveform configuration, the waveform configuration identifying a pattern associated with at least one parameter of a set of parameters, the pattern indicating a set of values associated with the at least one parameter, wherein the set of values comprises a set of delay values;

receiving a radar signal during at least one frame of a plurality of frames, the radar signal comprising a plurality of waveforms based at least in part on the waveform configuration, each respective waveform of the plurality of waveforms associated with the at least one parameter of the set of parameters, wherein a respective delay value of the set of delay values is a value of the at least one parameter, and a respective delay is based at least in part on the respective delay value of the set of delay values, the respective delay being different for each respective waveform of the plurality of waveforms associated with the at least one frame of the plurality of frames; and transmitting a reflected radar signal during the at least one frame of the plurality of frames.

24. The method of claim 23, wherein a respective phase for each respective waveform of the plurality of waveforms associated with the at least one frame of the plurality of frames being different for each respective waveform of the plurality of waveforms.

25. The method of claim 23, further comprising:

transmitting a second radar signal during the at least one frame of a plurality of frames, the second radar signal comprising a second plurality of waveforms, each respective waveform of the second plurality of waveforms associated with the at least one parameter of the set of parameters, a second value of the at least one parameter being different for each respective waveform of the second plurality of waveforms, the second value different than the value of the at least one parameter.

26. An apparatus for wireless communication, comprising:

at least one processor;

at least one memory coupled with the at least one processor; and instructions stored in the at least one memory and executable by the at least one processor to cause the apparatus to:

receive control signaling indicating a waveform configuration, the waveform configuration identifying a pattern associated with at least one parameter of a set of parameters, the pattern indicating a set of values associated with the at least one parameter, wherein the set of values comprises a set of delay values;

select a respective delay based at least in part on a respective delay value of the set of delay values for each respective waveform of a plurality of waveforms associated with at least one frame of a plurality of frames based at least in part on the waveform configuration, the respective delay being different for each respective waveform of the plurality of waveforms;

apply the respective delay for each respective waveform of the plurality of waveforms;

generate, based at least in part on applying the respective delay for each waveform of the plurality of waveforms, a radar signal comprising the plurality of waveforms based at least in part on the waveform configuration of the apparatus, each respective waveform of the plurality of waveforms associated with the at least one parameter of the set of parameters, wherein a respective delay value is a value of the at least one parameter; and transmit the generated radar signal during the at least one frame of the plurality of frames.

27. An apparatus for wireless communication, comprising:

at least one processor;

at least one memory coupled with the at least one processor; and instructions stored in the at least one memory and executable by the at least one processor to cause the apparatus to:

transmit control signaling indicating a waveform configuration, the waveform configuration identifying a pattern associated with at least one parameter of a set of parameters, the pattern indicating a set of values associated with the at least one parameter, wherein the set of values comprises a set of delay values;

receive a radar signal during at least one frame of a plurality of frames, the radar signal comprising a plurality of waveforms based at least in part on the waveform configuration, each respective waveform of the plurality of waveforms associated with the at least one parameter of the set of parameters, wherein a respective delay value of the set of delay values is a value of the at least one parameter, and the respective delay is based at least in part on the respective delay value of the set of delay values, the respective delay being different for each respective waveform of the plurality of waveforms associated with the at least one frame of the plurality of frames; and transmit a reflected radar signal during the at least one frame of the plurality of frames.

* * * * *